US007618317B2

(12) United States Patent
Jackson

(10) Patent No.: US 7,618,317 B2
(45) Date of Patent: Nov. 17, 2009

(54) METHOD FOR DEVELOPING GAMING PROGRAMS COMPATIBLE WITH A COMPUTERIZED GAMING OPERATING SYSTEM AND APPARATUS

(76) Inventor: Mark D. Jackson, 3902 Ridgeway Ct., Fort Collins, CO (US) 80526

( * ) Notice: Subject to any disclaimer, the term of this patent is extended or adjusted under 35 U.S.C. 154(b) by 191 days.

(21) Appl. No.: 10/241,804

(22) Filed: Sep. 10, 2002

(65) Prior Publication Data

US 2003/0069074 A1    Apr. 10, 2003

Related U.S. Application Data

(60) Provisional application No. 60/318,369, filed on Sep. 10, 2001.

(51) Int. Cl.
*A63F 13/12* (2006.01)
*G06F 12/16* (2006.01)
*G06F 21/22* (2006.01)
*G06F 1/30* (2006.01)
*H04K 1/00* (2006.01)

(52) U.S. Cl. .............................. 463/24; 463/16; 463/22; 463/29; 463/40; 463/42; 463/43; 380/251

(58) Field of Classification Search .................. 463/20, 463/21, 22, 23, 24, 25, 26, 29, 40–42, 43–45, 463/16; 273/138.1, 292; 380/251
See application file for complete search history.

(56) References Cited

U.S. PATENT DOCUMENTS

| 2,235,642 | A | 3/1941 | Lintern et al. |
|---|---|---|---|
| 3,825,905 | A | 7/1974 | Allen, Jr. |
| 3,838,264 | A | 9/1974 | Maker |
| 3,931,504 | A | 1/1976 | Jacoby |
| 4,072,930 | A | 2/1978 | Lucero et al. |
| 4,193,131 | A | 3/1980 | Lennon et al. |
| 4,200,770 | A | 4/1980 | Hellman et al. |
| 4,218,582 | A | 8/1980 | Hellman et al. |
| 4,250,563 | A | 2/1981 | Struger |
| 4,293,928 | A | 10/1981 | Baun |

(Continued)

FOREIGN PATENT DOCUMENTS

DE    37 00 861    7/1988

(Continued)

OTHER PUBLICATIONS

"The Linux Kernel," David A. Rusling, http://tldp.org/LDP/tlk/tlk-title.html, copyright 1996-1999, downloaded Feb. 21, 2006.*

(Continued)

*Primary Examiner*—Dmitry Suhol
*Assistant Examiner*—Matthew D. Hoel
(74) *Attorney, Agent, or Firm*—Weaver Austin Villeneuve & Sampson LLP

(57) ABSTRACT

The present invention in various embodiments provides a computerized wagering game method and apparatus that features an operating system kernel, a system handler application that loads and executes gaming program shared objects and features nonvolatile storage that facilitates sharing of information between gaming program objects. The system handler of some embodiments further provides an API library of functions callable from the gaming program objects, and facilitates the use of callback functions on change of data stored in nonvolatile storage. The nonvolatile storage also provides a nonvolatile record of the state of the computerized wagering game, providing protection against loss of the game state due to power loss. The system handler application in various embodiments includes a plurality of device handlers, providing an interface to selected hardware and the ability to monitor hardware-related events.

20 Claims, 13 Drawing Sheets

U.S. PATENT DOCUMENTS

| | | |
|---|---|---|
| 4,354,251 A | 10/1982 | Hellwig et al. |
| 4,355,390 A | 10/1982 | Hellwig et al. |
| 4,405,829 A | 9/1983 | Rivest et al. |
| 4,430,728 A | 2/1984 | Beitel et al. |
| 4,454,594 A | 6/1984 | Heffron et al. |
| 4,458,315 A | 7/1984 | Uchenick |
| 4,462,076 A | 7/1984 | Smith, III |
| 4,467,424 A | 8/1984 | Hedges et al. |
| 4,494,114 A | 1/1985 | Kaish et al. |
| 4,500,933 A | 2/1985 | Chan |
| 4,519,077 A | 5/1985 | Amin |
| 4,525,599 A | 6/1985 | Curran et al. |
| 4,582,324 A | 4/1986 | Koza et al. |
| 4,607,844 A | 8/1986 | Fullerton |
| 4,652,998 A | 3/1987 | Koza et al. |
| 4,658,093 A | 4/1987 | Hellman |
| 4,683,550 A | 7/1987 | Jindrick et al. |
| 4,727,544 A | 2/1988 | Brummer et al. |
| 4,752,068 A | 6/1988 | Endo |
| 4,757,505 A | 7/1988 | Marrington et al. |
| 4,759,064 A | 7/1988 | Chaum |
| 4,817,140 A | 3/1989 | Chandra et al. |
| 4,837,728 A | 6/1989 | Barrie et al. |
| 4,845,715 A | 7/1989 | Francisco |
| 4,848,744 A | 7/1989 | Steininger et al. |
| 4,856,787 A | 8/1989 | Itkis |
| 4,862,355 A | 8/1989 | Newman et al. |
| 4,865,321 A | 9/1989 | Nakagawa et al. |
| 4,911,449 A | 3/1990 | Dickinson et al. |
| 4,930,073 A | 5/1990 | Cina, Jr. |
| 4,944,008 A | 7/1990 | Piosenka et al. |
| 4,951,149 A | 8/1990 | Faroudja |
| 4,972,470 A | 11/1990 | Farago |
| 5,004,232 A | 4/1991 | Wong et al. |
| 5,021,772 A | 6/1991 | King et al. |
| 5,050,212 A | 9/1991 | Dyson |
| 5,103,081 A | 4/1992 | Fisher et al. |
| 5,109,152 A | 4/1992 | Takagi et al. |
| 5,146,575 A | 9/1992 | Nolan |
| 5,155,680 A | 10/1992 | Wiedemer |
| 5,155,768 A | 10/1992 | Matsuhara |
| 5,155,856 A | 10/1992 | Bock et al. |
| 5,161,193 A | 11/1992 | Lampson et al. |
| 5,179,517 A | 1/1993 | Sarbin |
| 5,224,160 A | 6/1993 | Paulini et al. |
| 5,235,642 A | 8/1993 | Wobber et al. |
| 5,259,613 A | 11/1993 | Marnell |
| 5,264,958 A | 11/1993 | Johnson |
| 5,283,734 A | 2/1994 | Yon Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease et al. |
| 5,342,047 A | 8/1994 | Heidel et al. |
| 5,343,527 A | 8/1994 | Moore |
| 5,353,411 A | 10/1994 | Nakaosa et al. |
| 5,375,241 A | 12/1994 | Walsh |
| 5,379,431 A | 1/1995 | Lemon et al. |
| 5,394,547 A | 2/1995 | Correnti et al. |
| 5,398,799 A | 3/1995 | Ranon et al. |
| 5,398,932 A | 3/1995 | Eberhardt et al. |
| 5,400,246 A | 3/1995 | Wilson et al. |
| 5,421,006 A | 5/1995 | Jablon et al. |
| 5,428,525 A | 6/1995 | Cappelaere et al. |
| 5,429,361 A | 7/1995 | Raven et al. |
| 5,442,568 A | 8/1995 | Ostendorf et al. |
| 5,444,642 A | 8/1995 | Montgomery et al. |
| 5,465,364 A | 11/1995 | Lathrop et al. |
| 5,469,571 A * | 11/1995 | Bunnell .................. 718/103 |
| 5,473,765 A | 12/1995 | Gibbons et al. |
| 5,473,785 A | 12/1995 | Lager et al. |
| 5,488,702 A | 1/1996 | Byers et al. |
| 5,489,095 A | 2/1996 | Goudard et al. |
| 5,497,490 A | 3/1996 | Harada et al. |
| 5,507,489 A | 4/1996 | Reibel et al. |
| 5,508,689 A | 4/1996 | Rado et al. |
| 5,542,669 A | 8/1996 | Charron et al. |
| 5,548,782 A | 8/1996 | Michael et al. |
| 5,553,290 A | 9/1996 | Calvert et al. |
| 5,568,602 A | 10/1996 | Callahan et al. |
| 5,575,717 A | 11/1996 | Houriet, Jr. et al. |
| 5,586,766 A | 12/1996 | Forte et al. |
| 5,586,937 A | 12/1996 | Menashe |
| 5,594,903 A * | 1/1997 | Bunnell et al. .............. 717/162 |
| 5,604,801 A | 2/1997 | Dolan et al. |
| 5,611,730 A | 3/1997 | Weiss |
| 5,634,058 A | 5/1997 | Allen et al. |
| 5,643,086 A | 7/1997 | Alcorn et al. .................. 463/29 |
| 5,644,704 A | 7/1997 | Pease et al. |
| 5,655,965 A | 8/1997 | Takemoto et al. |
| 5,664,187 A * | 9/1997 | Burkes et al. .............. 707/205 |
| 5,668,945 A | 9/1997 | Ohba et al. |
| 5,671,351 A | 9/1997 | Wild et al. |
| 5,688,174 A | 11/1997 | Kennedy |
| 5,702,303 A | 12/1997 | Takemoto et al. |
| 5,704,835 A | 1/1998 | Dietz, II |
| 5,707,286 A * | 1/1998 | Carlson ....................... 463/16 |
| 5,725,428 A | 3/1998 | Achmuller |
| 5,737,418 A | 4/1998 | Saffari et al. |
| 5,742,616 A | 4/1998 | Torreiter et al. |
| 5,742,825 A | 4/1998 | Mathur et al. |
| 5,752,882 A | 5/1998 | Acres et al. |
| 5,758,875 A | 6/1998 | Glacalone, Jr. |
| 5,759,102 A | 6/1998 | Pease et al. |
| 5,761,647 A | 6/1998 | Boushy |
| 5,768,382 A | 6/1998 | Schneier et al. |
| 5,778,226 A | 7/1998 | Adams et al. |
| 5,800,268 A | 9/1998 | Molnick |
| 5,809,329 A | 9/1998 | Lichtman et al. |
| 5,823,874 A | 10/1998 | Adams ....................... 463/17 |
| 5,848,250 A | 12/1998 | Smith et al. |
| 5,848,932 A | 12/1998 | Adams ....................... 463/20 |
| 5,851,149 A | 12/1998 | Xidos et al. |
| 5,863,041 A | 1/1999 | Boylan et al. ................ 273/292 |
| 5,870,587 A | 2/1999 | Danforth et al. |
| 5,871,400 A | 2/1999 | Yfantis |
| 5,872,973 A | 2/1999 | Mitchell et al. |
| 5,879,234 A | 3/1999 | Mengual |
| 5,889,990 A | 3/1999 | Coleman et al. |
| 5,893,121 A * | 4/1999 | Ebrahim et al. ............. 707/206 |
| 5,901,319 A | 5/1999 | Hirst |
| 5,934,672 A | 8/1999 | Sines et al. |
| 5,935,224 A | 8/1999 | Svancarek et al. |
| 5,944,821 A | 8/1999 | Angelo |
| 5,954,583 A | 9/1999 | Green |
| 5,970,143 A | 10/1999 | Schneier et al. |
| 5,971,851 A | 10/1999 | Pascal et al. |
| 5,980,384 A | 11/1999 | Barrie |
| 5,984,786 A | 11/1999 | Ehrman |
| 5,989,234 A | 11/1999 | Valerio et al. |
| 5,991,399 A | 11/1999 | Graunke et al. |
| 5,991,546 A | 11/1999 | Chan et al. |
| 5,995,745 A | 11/1999 | Yodalken |
| 5,999,990 A | 12/1999 | Sharrit et al. |
| 6,003,038 A | 12/1999 | Chen |
| 6,006,279 A | 12/1999 | Hayes |
| 6,008,279 A | 12/1999 | Shimizu et al. |
| 6,014,714 A | 1/2000 | Plyler et al. |
| 6,015,344 A | 1/2000 | Kelly et al. |
| 6,021,414 A | 2/2000 | Fuller |
| 6,026,238 A | 2/2000 | Bond et al. |
| 6,035,321 A | 3/2000 | Mays |
| 6,039,645 A | 3/2000 | Mazur |
| 6,039,648 A | 3/2000 | Guinn et al. |

| | | | |
|---|---|---|---|
| 6,044,428 A | 3/2000 | Rayabhari | |
| 6,044,471 A | 3/2000 | Colvin | |
| 6,052,778 A | 4/2000 | Hagy et al. | |
| 6,071,190 A | 6/2000 | Weiss et al. | |
| 6,073,124 A * | 6/2000 | Krishnan et al. | 705/59 |
| 6,075,939 A * | 6/2000 | Bunnell et al. | 717/107 |
| 6,099,408 A | 8/2000 | Schneier et al. | |
| 6,102,796 A * | 8/2000 | Pajitnov et al. | 463/9 |
| 6,104,815 A | 8/2000 | Alcorn et al. | |
| 6,104,859 A | 8/2000 | Yoshida et al. | 386/80 |
| 6,106,396 A * | 8/2000 | Alcorn et al. | 463/29 |
| 6,115,601 A | 9/2000 | Ferreira | |
| 6,117,010 A | 9/2000 | Canterbury et al. | |
| 6,126,548 A | 10/2000 | Jacobs et al. | |
| 6,134,677 A | 10/2000 | Lindsay | |
| 6,135,884 A | 10/2000 | Hedrick et al. | |
| 6,135,887 A | 10/2000 | Pease et al. | |
| 6,149,522 A | 11/2000 | Alcorn et al. | 463/29 |
| 6,165,072 A | 12/2000 | Davis et al. | |
| 6,181,336 B1 * | 1/2001 | Chiu et al. | 715/736 |
| 6,185,678 B1 | 2/2001 | Arbaugh et al. | |
| 6,195,587 B1 | 2/2001 | Hruska et al. | |
| 6,203,427 B1 | 3/2001 | Walker et al. | |
| 6,210,274 B1 * | 4/2001 | Carlson | 463/16 |
| 6,214,495 B1 * | 4/2001 | Segawa et al. | 430/5 |
| 6,215,495 B1 * | 4/2001 | Grantham et al. | 345/419 |
| 6,222,448 B1 | 4/2001 | Beck et al. | |
| 6,222,529 B1 * | 4/2001 | Ouatu-Lascar et al. | 715/745 |
| 6,224,482 B1 * | 5/2001 | Bennett | 463/20 |
| 6,243,692 B1 * | 6/2001 | Floyd et al. | 705/59 |
| 6,251,014 B1 | 6/2001 | Stockdale et al. | |
| 6,253,374 B1 | 6/2001 | Dresevic et al. | |
| 6,263,392 B1 | 7/2001 | McCauley | |
| 6,264,557 B1 | 7/2001 | Schneier et al. | |
| 6,269,474 B1 | 7/2001 | Price | |
| 6,279,124 B1 | 8/2001 | Brouwer et al. | |
| 6,290,602 B1 | 9/2001 | Kawano | |
| 6,315,666 B1 | 11/2001 | Mastera et al. | |
| 6,319,125 B1 * | 11/2001 | Acres | 463/25 |
| 6,322,445 B1 | 11/2001 | Miller | |
| 6,324,605 B1 | 11/2001 | Rafferty et al. | |
| 6,327,605 B2 | 12/2001 | Arakawa et al. | 708/501 |
| 6,331,146 B1 | 12/2001 | Miyamoto et al. | |
| 6,364,769 B1 | 4/2002 | Weiss et al. | |
| 6,368,219 B1 | 4/2002 | Szrek et al. | |
| 6,379,246 B1 | 4/2002 | Dabrowski | |
| 6,394,907 B1 | 5/2002 | Rowe | |
| 6,401,208 B2 | 6/2002 | Davis et al. | |
| 6,409,602 B1 | 6/2002 | Wiltshire et al. | |
| 6,446,211 B1 | 9/2002 | Colvin | |
| 6,446,257 B1 | 9/2002 | Pradhan et al. | |
| 6,449,687 B1 | 9/2002 | Moriya | |
| 6,453,319 B1 | 9/2002 | Mattis et al. | |
| 6,454,648 B1 | 9/2002 | Kelly et al. | |
| 6,460,142 B1 | 10/2002 | Colvin | |
| 6,484,264 B1 | 11/2002 | Colvin | |
| 6,496,808 B1 | 12/2002 | Aiello et al. | |
| 6,502,195 B1 | 12/2002 | Colvin | |
| 6,505,087 B1 | 1/2003 | Lucas et al. | |
| 6,510,521 B1 | 1/2003 | Albrecht et al. | |
| 6,527,638 B1 | 3/2003 | Walker et al. | |
| 6,577,733 B1 | 6/2003 | Charrin | |
| 6,595,856 B1 | 7/2003 | Ginsburg et al. | |
| 6,620,047 B1 | 9/2003 | Alcorn et al. | |
| 6,671,745 B1 | 12/2003 | Mathur et al. | |
| 6,785,825 B2 | 8/2004 | Colvin | |
| 6,792,548 B2 | 9/2004 | Colvin | |
| 6,792,549 B2 | 9/2004 | Colvin | |
| 6,795,925 B2 | 9/2004 | Colvin | |
| 6,795,928 B2 | 9/2004 | Bradley et al. | |
| 6,799,277 B2 | 9/2004 | Colvin | |
| 6,804,763 B1 * | 10/2004 | Stockdale et al. | 711/170 |
| 6,805,634 B1 | 10/2004 | Wells et al. | |
| 6,813,717 B2 | 11/2004 | Colvin | |
| 6,813,718 B2 | 11/2004 | Colvin | |
| 6,851,607 B2 | 2/2005 | Orus et al. | |
| 6,857,067 B2 * | 2/2005 | Edelman | 713/155 |
| 6,857,078 B2 | 2/2005 | Colvin et al. | |
| 6,866,581 B2 | 3/2005 | Martinek et al. | |
| 6,902,481 B2 | 6/2005 | Breckner et al. | |
| 6,908,391 B2 | 6/2005 | Gatto et al. | |
| 6,935,946 B2 | 8/2005 | Yoseloff | |
| 6,962,530 B2 | 11/2005 | Jackson | |
| 6,978,465 B2 * | 12/2005 | Williams | 719/321 |
| 6,988,267 B2 | 1/2006 | Harris et al. | |
| 7,043,641 B1 | 5/2006 | Martinek et al. | |
| 7,063,615 B2 | 6/2006 | Alcorn et al. | |
| 7,116,782 B2 | 10/2006 | Jackson et al. | |
| 7,203,841 B2 | 4/2007 | Jackson et al. | |
| 7,470,182 B2 | 12/2008 | Martinek et al. | |
| 2001/0003709 A1 * | 6/2001 | Adams | 463/20 |
| 2001/0010046 A1 * | 7/2001 | Muyres et al. | 705/52 |
| 2001/0044339 A1 | 11/2001 | Cordero et al. | 463/42 |
| 2001/0053712 A1 * | 12/2001 | Yoseloff et al. | 463/1 |
| 2002/0049909 A1 | 4/2002 | Jackson et al. | |
| 2002/0052230 A1 | 5/2002 | Martinek et al. | |
| 2002/0078142 A1 * | 6/2002 | Moore et al. | 709/203 |
| 2002/0116284 A1 | 8/2002 | Steelman et al. | |
| 2002/0151363 A1 * | 10/2002 | Letovsky et al. | 463/40 |
| 2003/0014639 A1 | 1/2003 | Jackson et al. | |
| 2003/0069074 A1 | 4/2003 | Jackson | |
| 2003/0078103 A1 | 4/2003 | LeMay et al. | |
| 2003/0181242 A1 * | 9/2003 | Lee et al. | 463/42 |
| 2003/0195033 A1 | 10/2003 | Gazdic et al. | |
| 2003/0203755 A1 | 10/2003 | Jackson | |
| 2003/0203756 A1 | 10/2003 | Jackson | |
| 2003/0224858 A1 | 12/2003 | Yoseloff et al. | |
| 2004/0002381 A1 | 1/2004 | Alcorn et al. | |
| 2004/0038740 A1 | 2/2004 | Muir | |
| 2004/0043814 A1 | 3/2004 | Angell et al. | |
| 2004/0072611 A1 | 4/2004 | Wolf et al. | |
| 2004/0106452 A1 | 6/2004 | Nguyen et al. | |
| 2004/0198479 A1 | 10/2004 | Martinek et al. | |
| 2004/0198494 A1 | 10/2004 | Nguyen et al. | |
| 2005/0192092 A1 | 9/2005 | Breckner et al. | |
| 2006/0123391 A1 | 6/2006 | Lai | |
| 2006/0287098 A1 | 12/2006 | Morrow et al. | |
| 2007/0015590 A1 | 1/2007 | Martinek et al. | |
| 2007/0270212 A1 | 11/2007 | Cockerille et al. | |
| 2008/0058055 A1 | 3/2008 | LeMay et al. | |
| 2008/0058097 A1 | 3/2008 | Martinek et al. | |
| 2008/0096656 A1 | 4/2008 | LeMay et al. | |
| 2008/0102919 A1 | 5/2008 | Rowe et al. | |

FOREIGN PATENT DOCUMENTS

| | | |
|---|---|---|
| DE | 40 14 477 | 7/1991 |
| EP | 0 685 246 A1 | 12/1995 |
| EP | 0798634 A1 | 10/1997 |
| EP | 0 996 058 A1 | 10/1998 |
| EP | 1255234 A2 | 6/2002 |
| GB | 0 072 395 | 9/1981 |
| GB | 2 121 569 | 12/1983 |
| GB | 2 147 773 | 5/1985 |
| GB | 2 201 821 | 9/1988 |
| GB | 2 202 984 | 10/1988 |
| GB | 2 253 325 A | 9/1992 |
| WO | WO 94/19784 | 9/1994 |
| WO | WO 96/00939 | 1/1996 |
| WO | WO 96/00950 | 1/1996 |
| WO | WO 96/14614 | 5/1996 |
| WO | WO 98/00207 | 1/1998 |
| WO | WO 98/20417 | 5/1998 |
| WO | WO 99/09474 | 2/1999 |
| WO | WO 99/49394 | 9/1999 |
| WO | WO 99/65579 | 12/1999 |

| | | |
|---|---|---|
| WO | WO 00/33196 | 6/2000 |
| WO | WO 01/22267 | 3/2001 |
| WO | WO 02/32526 | 4/2002 |
| WO | WO 02/072395 | 9/2002 |
| WO | WO 02/073501 | 9/2002 |
| WO | WO 2006/002084 | 1/2006 |

OTHER PUBLICATIONS

"Linux Kernel Glossary," entry for ZFOD (zero-fill-on-demand), http://www.kernelnewbies.org/glossary, downloaded Feb. 22, 2006.*

International Search Reports for applications PCT/US01/07447, PCT/US01/07381, and PCT/US02/30286.*

"The Linux Kernel," by David A. Rusling, 1999, http://tldp.org/LDP/tlk/tlk-title.html, downloaded Feb. 21$^{st}$, 2006.*

"Architecture for a Video Arcade Game Network," IBM Technical Disclosure Bulletin, Apr. 1, 1991, vol. 33, No. 11, pp. 138 to 141, NN9104138.*

Retro Fitting a Low-Boy Arcade Machine with a Pentium-Powered M.A.M.E. Setup. Oct. 1996, www.Cygnus.uwa.edu.au/~jaycole/jaw/arcade/html (5 pages).

Object-Oriented Programming Concepts, Sun Microsystems, Inc. (2002) (16 pages).

Terry Monlick, What is Object-Oriented Software, Software Design Consultants, LLC (1999), (5 pages).

OnCore Systems, http://www.oncoresystems.com (1999) (8 pages).

Encyclopedia, http://www eetnetwork com/encyclopedia, (2002) (7 pages).

Michael Tiemann, "Why Embedded Linux" http://linuxdevices.com/cgi-bin/printerfriendly.cgi?id=AT8926600504 (Oct. 28, 1999) (6 pages).

Rick Lehrbaum, "Why Linux" http://linuxdevices.com/cgi-bin/printerfriendly.cgi?id=AT9663974466 (Jan. 31, 2000), pp. 1-2.

Rick Lahrbaum. "Why Linux" http://linuxdevices.com/cgi-bin/printerfriendly.cgi?id=AT3611822672 (Feb. 19, 2000), pp. 1-5.

David A. Rusting, The Linux Kernel http://www.tidp.org/LDP/tlk.htm (1999), (168 pages).

Australian Office Action dated Dec. 12, 2005, from related Australian Application No. 2001245518 (2 pages).

Answer and Counterclaims to Second Amended Complaint filed in connection with Civil Action No. CV-S-0 1-1498, pp. 1-26 and certificate of service page.

Defendants', Supplemental Response to Plaintiffs' First Set of Interrogatories filed in connection with Civil Action No. CV-S-01-1498, pp. 1-3, 50-68 and 85-86.

Davida, G. et al., "Defending Systems Against Viruses through Cryptographic Authentication," Proceedings of the Symposium on Security and Privacy, *iEEE Comp. Soc. Press*, pp. 312-318 (May, 1, 1989).

Document entitled: "Fact Sheet on Digital Signature Standard" dated May 1994, 6 pages.

Federal Information Processing Standards (FIPS) Publication 180-1 entitled: "Secure Hash Standard" dated Apr. 17, 1995, 2 title pages, abstract page and pp. 1-21.

Federal Information Processing Standards (FIPS) Publication 180 entitled: "Secure Hash Standard" dated May 11, 1993, title page, abstract page and pp. 1-20.

Federal Information Processing Standards (FIPS) Publication 186 entitled: "Digital Signature Standard (DSS)" dated May 19, 1994, 17 pages.

Hellman, Martin E., "The Mathematics of Public-Key Cryptography," Scientific American, vol. 241, No. 8, Aug. 1979, pp. 146-152 and 154-157.

Rivest, et al., "A Method for Obtaining Digital Signatures and Public-Key Cryptosystems," Communications of the ACM, vol. 21, No. 2, Feb. 1978, pp. 120-126.

Bauspiess, et al., "Requirements For Cryptographic Hash Functions," *Computers and Security*, 5:427-437 (Sep. 11, 1992).

Complaint for patent infringement filed by Aristocrat Technologies, et al., dated Jan. 22, 2002, Civil Action No. CV-S-02-0091.

Bakhtiari et al., Cryptographic Hash Functions: A Survey, 1995, Centre for Computer Security Research, pp. 1-26.

Schneier B.: "Applied Cryptography, Second Edition. Protocols, Algorithms, and Source Code in C" 1996, John Wiley & Sons, Inc. USA, XP002344241, pp. 446-449; pp. 458-459.

Menezes A., Van Oorschot P., Vanstone S.: "Handbook of Applied Cryptography" 1996, CRC Press, USA, XP002344242, pp. 365-366.

European Office Action dated Dec. 8, 2005 from a related EP Application No. 02768907.4 4 pages.

Game Programming Gems, Mark DeLourna, Charles River Media, ISBN: 1-58450-049-2, 2000 (12 pages).

DirectX Media: Multimedia Services for Microsoft Internet Explorer and Microsoft Windows, MSDN Library, http://msdn.microsoft.com, Oct. 1998 (10 pages).

Levinthal, Adam and Barnett, Michael, "The Silicon Gaming Odyssey Slot Machine," Feb. 1997, *COMPCON '97 Proceedings, IEEE* San Jose, CA; *IEEE Comput. Soc.*, pp. 296-301.

Bernardi, Fabrice et al., "Model Design Using Hierarchical Web-Based Libraries", Jun. 10-14, 2002, Annual ACM IEEE Design Automation Conference, New Orleans, Louisiana, pp. 14-17.

WinSystems, http://www.webarchive.org/web/19881212034126/http://winsystems.com/ (Dec. 12, 1998), downloaded from the internet on Oct. 27, 2003, all pages.

RTD USA, http://www.webarchive.org.web/1990422091026/-http://rtdusa.com/ (Apr. 22, 1999), downloaded from the internet on Oct 27, 2003, all pages.

Mardsen, et al. Development of a PC-Windows Based Universal Control System, 5$^{th}$ Intl. Conf. On FACTORY 2000, Apr. 2-4, 1997, Conf. Pub. No. 435, pp. 284-287.

RTD USA, www.rtdusa.com (1998), downloaded from the Internet on Mar. 20, 2003, pp. 1-49.

Paul Virgo, Embedded PC's for the Industrial Marketplace: An Analysis of the STD Bus, WESCON/'93 Conference Record, Sep. 28-30, 1993, pp. 621-623.

Jahn Luke et al., A commercial off-the-shelf based replacement strategy for aging avionics computers, Aerospace and Electronics Conference, 1998. NAECON 1998, Proceedings of the IEEE 1998 National, Jul. 13-17, 1998, pp. 177-181.

Get Control, Inc., PC-104 DIG-10-48 Plus, http://www.getcontrol.com downloaded from the internet on Mar. 20, 2003, p. 1.

D. Powell et al., GUARDS: a generic upgradeable architecture for real-time dependable systems, Parallel and Distributed Systems, IEEE Transactions on, vol. 10, Issue: 6, Jun. 1999, pp. 580-599.

Robert A. Burckle, PC/104 Embedded Modules: The New Systems Components, http://www.winsystems.com/papers/sys_components.pdf downloaded from the internet on Mar. 20, 2003, pp. 1-3.

WinSystems, www.winsystems.com downloaded from the internet on Apr. 2, 2003, pp. 1-25.

Jim Blazer, PC/104 Intelligent Data Acquisition, PC Embedded Solutions (Spring 1998), pp. 1-2.

Robert A. Burckle, STD Bus: Performance without Complexity, http://www.winsystems.com/papers/stdperformance.pdf (Aug. 1, 2001), pp. 1-3.

Craig Matasumoto, Intel starts preaching about security, EE Times http://eetimes.com/story/OEG1990121S0014 (Jan. 21, 1999), pp. 1-4.

Supplementary European Search Report dated Oct. 13, 2006, from corresponding EP Application No. 02775968.7.

European Office Action dated Aug. 23, 2007, from corresponding EP Application No. 02775968.7.

Bovet, D. P. et al., "Understanding the Linux Kernel" Jan. 2001, pp. 1-34, XP002332389.

Answer and Counterclaims to Second Amended Complaint filed in connection with Civil Action No. CV-S-01-1498, (pp. 1-3, 50-68 and 85-86).

European Search Report dated Sep. 28, 2005 from corresponding EP Application No. 01918440.7, 3 pages.

"Linux Kernel Glossary," entry for ZFOD (zero-fill-on-demand), http;//www.kernelnewbies.org/KernelGlossary, downloaded Jul. 7, 2007 (14 pgs.).

PCT Search Report mailed Jun. 12, 200 from PCT/US02/07447, 5 pgs.

International Preliminary Examination Report dated Dec. 23, 2004 for PCT/US01/07447.

U.S. Office Action dated Jun. 15, 2004 from related U.S. Appl. No. 10/134,657 11 pages.
U.S. Final Office Action dated Jan. 30, 2007 from related U.S. Appl. No. 10/134,657, 11 pages.
U.S. Office Action dated Jul. 31, 2007 from related U.S. Appl. No. 10/134,657, 10 pages.
U.S. Office Action dated Dec. 23, 2005 from U.S. Appl. No. 10/308,845.
U.S. Final Office Action dated Jun. 2, 2006 from related U.S. Appl. No. 10/308,845.
U.S. Office Action dated Dec. 13, 2006 from U.S. Appl. No. 10/308,845.
U.S. Final Office Action dated Aug. 13, 2008 from related U.S. Appl. No. 10/134,657, 9 pgs.
U.S. Office Action dated Jan. 22, 2009 from related U.S. Application No. 10/134,657, 19 pgs.
History of GSA, Web page [online]. Gaming Standards Association, 1997 [retrieved on Aug. 7, 2007] Retrieved from the Internet: <URL:http://www.gamingstandards.com/index.php?page=what_is_gsa/history_of_gsa>, 1 pg.
Value Proposition, Web page [online]. Gaming Standards Association, 1997 [retrieved on Aug. 7, 2007] Retrieved from the Internet: <URL:http://www.gamingstandards.com/index.php?page=what_is_gsa/value_proposit ion>, 2 pgs.
U.S. Office Action dated Nov. 22, 2005 from related U.S. Appl. No. 10/182,469.
U.S. Final Office Action dated Feb. 7, 2007 from related U.S. Appl. No. 10/182,469.
U.S. Office Action dated Aug. 14, 2007 from related U.S. Appl. No. 10/182,469.
U.S. Final Office Action dated Aug. 13, 2008 from related U.S. Appl. No. 10/182,469.
U.S. Office Action dated Mar. 23, 2005 from U.S. Appl. No. 10/040,239.
U.S. Office Action dated Jun. 29, 2006 from U.S. Appl. No. 10/040,239.
U.S. Office Action dated Apr. 16, 2007 from U.S. Appl. No. 10/040,239.
U.S. Office Action dated Jan. 24, 2008 from U.S. Appl. No. 10/040,239.
Notice of Allowance dated Aug. 4, 2008 from U.S. Appl. No. 10/040,239.
Notice of Allowance dated Jan. 14, 2009 from U.S. Appl. No. 10/040,239.
AU Office Action dated Sep. 10, 2007 from AU Application No. 2002331912, 3 pgs.
Office Action dated Jan. 24, 2008 from U.S. Appl. No. 11/933,057.
Notice of Allowance dated Aug. 1, 2008 from U.S. Appl. No. 11/933,057.
Notice of Allowance dated Jan. 9, 2009 from U.S. Appl. No. 11/933,057.
Office Action dated Jul. 2, 2004 from related U.S. Appl. No. 10/041,212, 12 pgs.
Notice of Allowance dated Jan. 26, 2005 from U.S. Appl. No. 10/041,212.
ISR dated Jun. 10, 2003 from PCT Application No. PCT/US02/30610, 7 pgs.
PCT Written Opinion dated Jul. 15, 2003 from PCT Application No. PCT/US02/30610, 2 pgs.
Examiner's First Report dated Sep. 7, 2007 from AU Application No. 2002327737.
EPO Examination Report dated Nov. 19, 2007 from related EP Application No. 02763743.8.
European Search Report dated Dec. 12, 2003 from EP Applicatin No. 02253034.9, 3 pgs.
Supplementary Partial EP Search Report dated Apr. 17, 2007 from EP Application No. 01918453.0-2221.
Australian Examination Report dated Jul. 10, 2007 from AU Application No. 2001245529.
U.S. Office Action mailed Dec. 4, 2000 from U.S. Appl. No. 09/405,921.
U.S. Office Action mailed Apr. 20, 2001 from U.S. Appl. No. 09/405,921.
U.S. Office Action mailed Sep. 24, 2001 from U.S. Appl. No. 09/405,921.
U.S. Office Action mailed Jun. 14, 2002 from U.S. Appl. No. 09/405,921.
U.S. Office Action mailed Apr. 2, 2003 from U.S. Appl. No. 09/405,921.
U.S. Office Action mailed Oct. 3, 2003 from U.S. Appl. No. 09/405,921.
U.S. Office Action mailed Jun. 10, 2004 from U.S. Appl. No. 09/405,921.
Notice of Allowance mailed Dec. 3, 2004 from U.S. Appl. No. 09/405,921.
U.S. Office Action mailed Apr. 14, 2003 from U.S. Appl. No. 09/847,051.
U.S. Office Action mailed Nov. 4, 2003 from U.S. Appl. No. 09/847,051.
U.S. Office Action mailed May 6, 2004 from U.S. Appl. No. 09/847,051.
Notice of Allowance mailed Nov. 4, 2004 from U.S. Appl. No. 09/847,051.
U.S. Office Action mailed Aug. 29, 2001 from U.S. Appl. No. 09/520,405.
U.S. Office Action mailed Aug. 2, 2002 from U.S. Appl. No. 09/520,405.
U.S. Office Action mailed Mar. 20, 2003 from U.S. Appl. No. 09/520,405.
U.S. Office Action mailed Sep. 8, 2003 from U.S. Appl. No. 09/520,405.
U.S. Office Action mailed Sep. 3, 2004 from U.S. Appl. No. 09/520,405.
U.S. Office Action mailed Dec. 20, 2005 from U.S. Appl. No. 09/520,405.
U.S. Office Action mailed Jul. 14, 2006 from U.S. Appl. No. 09/520,405.
U.S. Office Action mailed Mar. 7, 2007 from U.S. Appl. No. 09/520,405.
U.S. Office Action mailed Sep. 13, 2007 from U.S. Appl. No. 09/520,405.
U.S. Office Action mailed Jul. 8, 2008 from U.S. Appl. No. 09/520,405.
U.S. Office Action mailed Mar. 18, 2009 from U.S. Appl. No. 09/520,405.
U.S. Office Action mailed Nov. 10, 2004 from U.S. Appl. No. 10/827,042, 12 pgs.
U.S. Office Action mailed Jan. 19, 2006 from U.S. Appl. No. 10/827,042, 12 pgs.
U.S. Office Action mailed Feb. 12, 2007 from U.S. Appl. No. 10/827,042.
Notice of Allowance mailed Aug. 23, 2007 form U.S. Appl. No. 10/827,042.
Allowed claims from U.S. Appl. No. 10/827,042.
Supplemental Notice of Allowance mailed May 5, 2008 from U.S. Appl. No. 10/827,042.
Oral Proceedings Mailed Sep. 15, 2008 In Europaean Application No. 01918453.0.
Office Action mailed Dec. 30, 2008 in Canadian Application No. 2,402,389.
Office Action mailed Dec. 1, 2008 In Australian Application No. 2008200148.
Office Action mailed Nov. 6, 2008 in Canadian Application No. 2,402,351.
Written Opinion of the International Searching Authority mailed Feb. 24, 2009 in Application No. PCT/US2008/087809 [P078X1WO].
International Search Report mailed Feb. 24, 2009 in Application No. PCT/US2008/087809 [P078X1WO].
Chatley, Robert et al., "MagicBeans: a Platform for Deploying Plugin Components," Component Deployment, Lecture Notes in Computer Science LNCS, Springer Verlag, Berlin/Heidelberg vol. 3083, May 1, 2004, pp. 97-112. Retreived form the Internet, URL: http://pubs.doc.ic.ac.uk/MagicBeans/MagicBeans.pdf.

* cited by examiner

METHOD FOR DEVELOPING GAMING PROGRAMS COMPATIBLE WITH A COMPUTERIZED GAMING OPERATING SYSTEM AND APPARATUS

NOTICE OF COPENDING APPLICATIONS

This application is a non-provisional application claiming priority from Provisional Patent Application Ser. No. 60/318,369 filed Sep. 10, 2001, entitled: Method for Developing Gaming Programs Compatible with a Computerized Gaming Operating System and Apparatus.

BACKGROUND OF THE INVENTION

1. Field of the Invention

The present invention relates to wagering games, particularly computer based wagering games, computer based wagering games running on an operating system, and methods for developing games on a standard gaming operating system.

2. Background of the Art

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit. This is an accepted distinction in the art from the playing of games, which implies the lack of value depending upon the outcome and in which skill is ordinarily an essential part of the game. On the contrary, within the gaming industry, particularly in computer based gaming systems, the absence of skill is a jurisdictional requirement in the performance of the gaming play.

One popular gaming system of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a pre-selected number of winning symbol combinations, the machine releases money into a payout chute or increments a credit meter by the amount won by the player. For example, if a player initially wagered two coins of a specific denomination and that player achieved a payout, that player may receive the same number or multiples of the wager amount in coins of the same denomination as wagered.

There are many different formats for generating the random display of events that can occur to determine payouts in wagering devices. The standard or original format was the use of three reels with symbols distributed over the face of the reel. When the three reels were spun, they would eventually each stop in turn, displaying a combination of three symbols (e.g., with three reels and the use of a single horizontal payout line as a row in the middle of the area where the symbols are displayed). By appropriately distributing and varying the symbols on each of the reels, the random occurrence of predetermined winning combinations can be provided in mathematically predetermined probabilities. By clearly providing for specific probabilities for each of the pre-selected winning outcomes, precise odds that would control the amount of the payout for any particular combination and the percentage return on wagers for the house could be reasonably controlled.

Other formats of gaming apparatus that have developed in a progression from the pure slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video gaming systems therefore were simulated slot machines. The use of video gaming apparatus to play new gaming applications such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of gaming applications, bonus plays, bonus awards, and progressive jackpots have been introduced with great success. The bonuses may be associated with the play of gaming applications that are quite distinct from the play of the original gaming format, such as the video display of a horse race with "bets" on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual "dealer."

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differs in fairly subtle ways as to the manner in which the bonus round is played. British Patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. Nos. 5,823,874 and 5,848,932 describe a gaming device comprising:

a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as a conventional slot and video machine, except that a redemption ticket rather than an immediate payout is dispensed. The processor may be present in the terminal or in a central computer.

The vast array of electronic video gaming apparatus that is commercially available is not standardized within the industry or necessarily even within the commercial line of apparatus available from a single manufacturer. One of the reasons for this lack of uniformity or standardization is the fact that the operating systems that have been used to date in the industry are primitive. As a result, the programmer must often create code for each and every function performed by each individual apparatus.

Attempts have been made to create a universal gaming engine for a gaming machine and are described in Carlson U.S. Pat. No. 5,707,286. This patent describes a universal gaming engine that segregates the random number generator and transform algorithms so that this code need not be rewritten or retested with each new game application. All code that is used to generate a particular game is contained in a rule EPROM in the rules library. Although the step of segregating random number generator code and transform algorithms has reduced the development time of new games, further improvements were needed.

One significant economic disadvantageous feature with commercial video wagering gaming units that maintains an artificially high price for the systems in the market is the use of unique hardware interfaces in the various manufactured video gaming systems. The different hardware, the different access codes, the different pin couplings, the different harnesses for coupling of pins, the different functions provided from the various pins, and the other various and different configurations within the systems has prevented any standard from developing within the technical field. This is advantageous to the equipment manufacturer, because the gaming formats for each system are provided exclusively by a single manufacturer, and the entire systems can be readily rendered obsolete, so that the market will have to purchase a complete unit rather than merely replacement software, and aftermarket gaming designers cannot easily provide a single gaming application that can be played on different hardware.

The invention of computerized gaming systems that include a common or "universal" video wagering game controller that can be installed in a broad range of video gaming apparatus without substantial modification to the gaming apparatus controller has made possible the standardization of many components and of corresponding gaming software within gaming systems. Such systems desirably will have functions and features that are specifically tailored to the unique demands of supporting a variety of gaming applications and gaming apparatus types, and doing so in a manner that is efficient, secure, and cost-effective to operate.

What is desired is an architecture and method of providing a gaming-specific platform that features reduced game development time and efficient gaming operation, provides security for the electronic gaming system, and does so in a manner that is cost-effective for gaming software developers, gaming apparatus manufacturers, and gaming apparatus users. An additional advantage is that the use of the platform will speed the review and approval process for gaming applications with the various gaming agencies, bringing the gaming formats and gaming applications to market sooner.

The nature of gaming systems and the stringent controls applied to gaming systems and gaming applications by jurisdictional controls (e.g., the Nevada State Gaming Commission, the New Jersey State Gaming Commission, the Mississippi State Gaming Commission, the California State Gaming Commission, the United Kingdom Gaming Commission, etc.) makes the development of a standard operating system and the ability of the game developers to work with such gaming operating systems unique within the field of computer based designer/developer interactions.

One of the reasons that Microsoft Windows® became the leading operating system throughout the world for personal computers was based upon its business strategy of providing access to Microsoft Windows® on-line to developers using an Application Program Interface (API) through which developers could communicate with the Windows® operating system, without being able to modify the underlying operating system (OS). This enabled Windows® to be supported by a vast network of private developers so that significant amounts of software became available for Windows® while other competing operating systems (e.g., Mac OS, Unix and Linux) had much fewer numbers of software programs available to use with these systems. However, the Microsoft Windows® operating system was not designed to support gaming systems and does not contain the essential software components needed for a gaming jurisdiction approvable operating system or gaming application.

Some game systems (as opposed to gaming systems) also attempted an on-line approach to assisting developers in using proprietary game operating systems for development of games compatible with the game operating system. One such on-line system was Adventurebuilder, which has apparently been removed from active on-line operation, even though its API addressable OS has been archived at http://archive.wustl.edu.languages/smalltalk/Smalltalk/st80_CastleMS— . . . /CastleMS.s and the entire 195 pages of text can be accessed at that site.

Additionally, U.S. Pat. No. 6,181,336 B1 (Chiu et al.) describes a system for providing an integrated, efficient and consistent production environment for the shared development of multimedia productions. Examples of multimedia productions include feature animation films, computerized animation films, interactive video games, interactive movies, and other types of entertainment and/or educational multimedia works. The development of such multimedia products typically involves heterogeneous and diverse forms of multimedia data. Further, the production tools and equipment that are used to create and edit such diverse multimedia data are in and of themselves diverse and often incompatible with each other. The incompatibility between such development tools can be seen in terms of their methods of operation, operating environments, and the types and/or formats of data on which they operate. The common utilities, methods and services disclosed therein, are used to integrate the diverse world of multimedia productions. By using the common utilities, methods and services provided, diverse multimedia production tools can access, store, and share data in a multiple user production environment in a consistent, safe, efficient and predictable fashion.

SUMMARY OF THE INVENTION

The present invention provides a method for a developer to access a unique gaming operation system that can support a wide variety of gaming applications. The developer can access the operating system through an Application Program Interface (API), respond to input from the developer without alteration of the gaming components stored in the operating system, and then enables the developer, by communication with the operating system, to develop a chip, gaming unit or other software that can be communicationally connected to the operating system to play or execute a gaming application, using the operating system as the primary engine for running the gaming application. The developer is capable of using any desired software system to develop the gaming application (e.g., Windows® 98, Windows® NT, Windows® XP, Mac OS, Unix, Linux, etc.) and still communicate to the gaming operating system through the API. The developed chip or software stored on one or more different media, such as EPROM flash memory, CD ROM, etc. or other software containing the gaming play content of a new gaming format may then be inserted into any gaming box with the host operating system by simply replacing a gaming chip CD ROM, disc or other storage media that has been developed through use of access to the operating system through the API, and that gaming application is assured of performance and can have a significantly reduced approval time through jurisdictional gaming agencies.

The present invention in various embodiments provides such a method to be practiced on a computerized wagering gaming operating system and apparatus that features a proprietary operating system, such as, for a preferred example, an operating system kernel. The apparatus also may include selected device handlers and system libraries, and have other device handlers that are disabled or removed. The present invention features a system handler application that may be part of the operating system. The system handler loads and executes gaming program objects that are part of the operating system and features nonvolatile storage that facilitates sharing of information between gaming program objects. The system handler of some embodiments further provides an API library of functions callable from the gaming program shared objects, and may in some embodiments facilitate the use of callback functions on change of data stored in nonvolatile storage. A nonvolatile record of the state of the computerized wagering gaming application is stored on the nonvolatile storage, providing protection against loss of the gaming state due to power loss. The system handler application in various embodiments includes a plurality of device handlers, providing an interface to selected hardware and the ability to monitor hardware-related events.

DETAILED DESCRIPTION OF THE INVENTION

Figure 1:
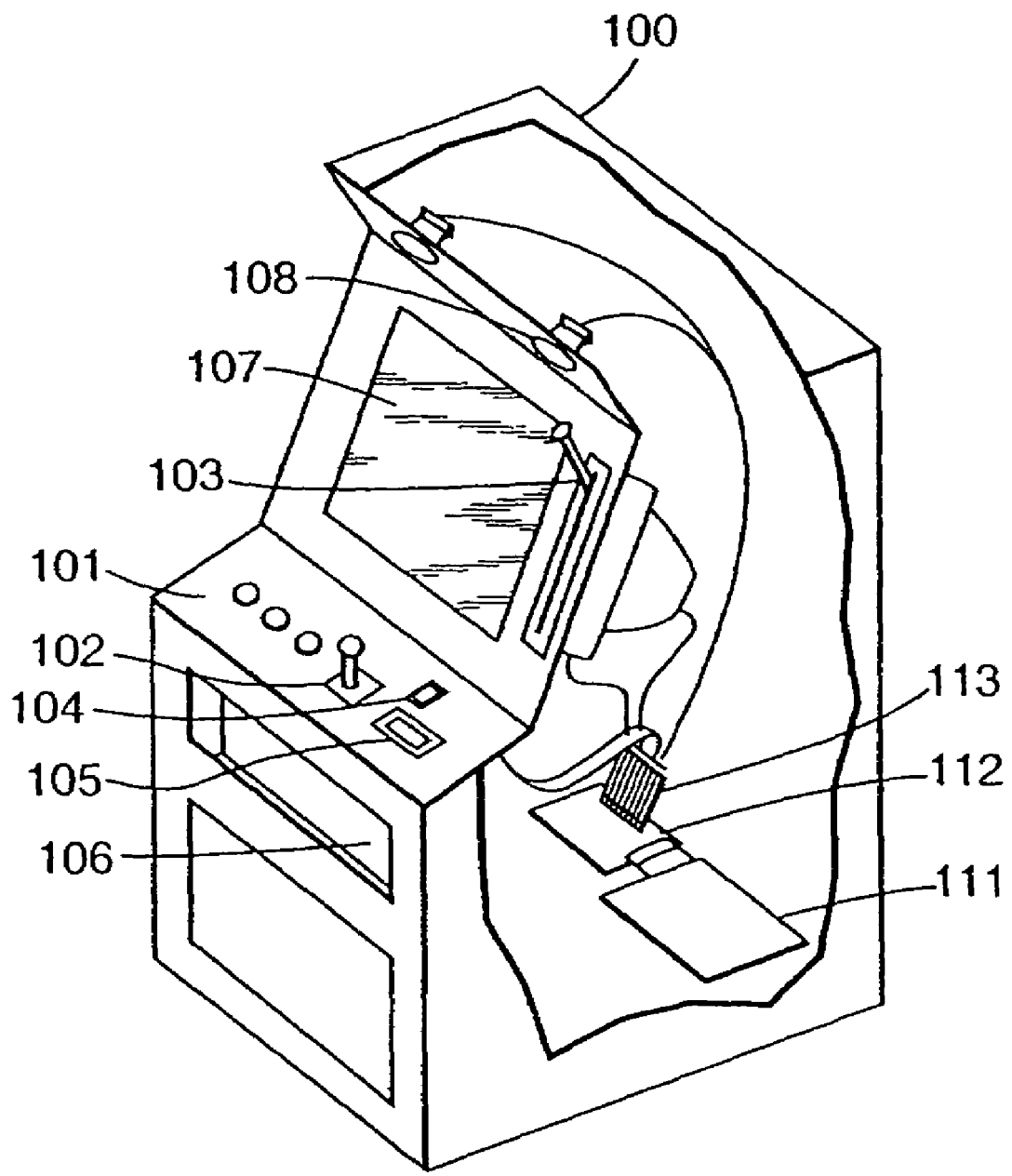
FIG. 1 shows a computerized wagering game apparatus as may be used to practice an embodiment of the present invention.

In the following detailed description of sample embodiments of the invention, reference is made to the accompanying drawings that form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims. It is essential to an appreciation of the practice of the present invention that the jurisdictional approval requirements and the industry standards of the gaming industry be considered in determination of the skill and technical sophistication of the present technology and invention.

In this document, the term "software component" can refer to any software module or grouping of modules. Under this definition a protocol module could be considered to be a type of software component, as could a complete operating system, or even a piece of an operating system. For the purposes of this document, a "software component" will be considered to be the set of code that an individual operating system provider provides.

The Nevada Gaming Control Board defines a gaming-related software component and uses a simple test to determine if a software subsystem falls under the definition of a gaming device. A primary element of a "Gaming Device" under NRS 463.0155 is a component that must be used remotely or directly in connection with a game (gaming application) and that affects the result of a wager by determining win or loss (based on a probability). Taking into account this definition, the Nevada Gaming Control Board uses a simple test: if an operating system or other software component can be shown to be usable in other fields or applications and the component is not involved in the calculation of wagering win or loss, then it is not a gaming-related piece of software. Those software components that relate to the presentation, decision-making and storage of win/loss information are the ones that are of primary concern to the Commission.

Nevada gaming laws and regulations require that the "Manufacturer" of a gaming device must be licensed. Manufacturer is defined in NRS 463.0172 as one who: "manufactures, assembles, programs or makes modifications to a gaming device or cashless wagering system . . . or who designs, controls the design or maintains a copyright over the design of a program which can't be reasonably demonstrated to have any use other than in a gaming device or cashless wagering system."

Therefore, where a gaming device contains software written by multiple vendors, an analysis must be made as to whether a gaming license is required by each vendor depending on whether the component provided by each vendor is gaming related. It may be that a vendor that supplies certain code may not have to be licensed in order for a licensed vendor to include that code on a gaming device. The complications arise when considering the different possibilities that can occur, as considered below.

The concept of trust or authenticity is the basis of all gaming regulations. To have a high degree of confidence in the fairness, integrity and security of a gaming device, it is necessary to be able to trust that the software components really do what they have been tested for and approved to do. There are different ways to establish such trust. Providing source code and other documentation of the software component is one such method. Other methods include public key infrastructure (PKI) to authenticate game code and data, requiring that the physical storage location for the code be on unwritable media, etc. In the case of PKI authentication, it is critical that the software component that provides the authentication service has the highest level of trust. If this is not true, then the purpose is entirely lost. For the purposes of this document, it will help with clarity to refer to the software component that provides authentication services as the operating system, or just OS. This is mainly for readability and understanding, but it is important that in systems that contain multiple software components, an OS/application type-relationship between the components is just one configuration.

Most gaming jurisdictions require devices that contain code that is stored in writable media to have an approved method to verify the integrity of the code that is stored there. Using PKI signatures is a commonly used and accepted method for such authentication. This implies that one software component inherently has a higher trust level than the one being authenticated. In gaming jurisdictions, read-only storage on EPROM with available source code has the highest level of trust because the code can be easily verified by spot-checking devices in the field. The code that exists on the EPROM will in turn check the signatures for the code stored on the writable media. Assuming things check out, the device may now proceed with operation. U.S. Pat. Nos. 6,149,552; 6,106,396; 6,104,859; and 5,643,086 (The Alcorn Patents) describe various authentication techniques for use in gaming systems. Although authentication and/or encryption systems are essential for commercial computer based gaming products, they need not be present on the system that is provided for access to the developer. The absence of the authentication system at this point in the development procedure may simplify communication and additionally speed up development. The authentication system and the encryption processes attendant thereto may be added into the commercial gaming apparatus without adversely affecting the ability of the developed gaming application or gaming rules chip to operate on the operating system.

The availability of source code mentioned above is extremely important when one considers this hierarchy of trust between software components that has to be strictly enforced in order to not compromise the integrity of the system. Only those software components that have the highest level of trust should be in a position to certify or authenticate other components. Those components that exist on writable media or do not have source code availability automatically have a lower level of trust. In the case of unlicensed vendors of operating systems with no source code available, for example, you have a situation where an untrusted, unproven software component provides authentication to a component on writable media, which is questionable at best. That provides a complication in the development of gaming application software and hardware to be used on a proprietary operating system, particularly on-line (over the internet) where identification of users may be problematic and control over secondary distribution or redistribution of the operating system and its source codes are problematic. Such uncontrolled distribution could compromise the ultimate security of the gaming apparatus in the casinos, and could lead to a refusal of gaming operators for the proprietary gaming operating system and for gaming applications provided on that operating system.

As indicated above, an API, or Application Programming Interface, is a set of methods used to interface from one communicator (e.g., a developer operating on its own computer and operating system) to a distal information component such as a software component (distal meaning over the internet, on-line, off a memory source such as compact disk, floppy disk, connected hard drive, or other information storage media with which the developer can communicate). These methods may be implemented using message passing, function calls using static or dynamic linking, or some other way. The important common function of every API is to isolate the data and low-level functions in one software component from being accessed except through the use of a common set of access methods.

The primary problem with having a number of software components existing on a single system has to do with defining the boundaries between the components. The only way the components can be separated into completely contained pieces is to define an API to which all the components conform. As long as this is the only way in which the pieces interact, the security of the distal information component is satisfactory.

One way of overcoming the delays and difficulties in introducing gaming applications to the industry is by practicing a method within the scope of the present invention. As a first step, a gaming operating system is provided that contains objects that can be used in gaming applications and gaming apparatus (whether video gaming or reel-type gaming apparatus). This gaming operating system would include functions in a secure computing system (e.g., computer, server, microprocessor, etc.) or memory system (floppy disk, compact disk, optical disk, hard drive, etc.), these functions being useful in gaming apparatus. The developer provides gaming application specific data (that is rules, directions, payout schedules, numbers of rounds, player activity requirements, and the like) to the Application Programming Interface, creates and ultimately compiles the information needed to direct the gaming operating system to execute the functions necessary to play the gaming application, and provide that compiled information to a gaming apparatus with the operating system in a commercial environment to practice the game.

The method comprises assisting in the development of a computer based wagering gaming application with at least the steps of:

providing a gaming operating system comprising a library of at least two software gaming callback functions and/or primary gaming states;

providing an Application Programming Interface enabling communication from a distal intelligence source to the gaming operating system;

communicating with the Application Programming Interface to the functions and/or primary gaming states in the library of the gaming operations;

providing gaming specific data relating to at least one specific gaming application; and compiling a program specific to at least one gaming application that is compatible with the gaming operating system through the use of the gaming operating system API.

This method could have the compiled program specific to at least one gaming application provided on a storage device. Some gaming applications have multiple games, and/or bonus rounds that can be included on the storage device. The method may be practiced either with or without security features enabled when communicating with the Application Programming Interface is performed. Security features can be added later when the commercial product is introduced or qualified by the regulatory commissions.

Another way of describing the method would be as assisting in the development of a computer based wagering gaming application comprising the steps of:

providing a gaming operating system comprising a library of at least two software gaming elements selected from the group consisting of a random number generator, a game initiation sequence, a value module (e.g., one or more modules providing controls relating to coin changing, coin recognition, currency recognition, credit recognition/storage, ticket recognition/printout, etc.), a bonus module (e.g., bonus, jackpot, additional play, alternative play), a video gaming module (e.g., including actual image files, image sequencing files, clip art files, video storage files [e.g., empty or partial files], color files, etc.), an audio gaming module (sound files, sound sequence files, sound files tied to video events, volume controls, etc.), a jackpot module, a graphics conversion tool, a debugging tool, a pay-out table module, a value-handling module, a power-loss back-up module, a gaming payout history module, a player history module, and a user interaction module (e.g., handle controls, button controls, touch-screen controls, joystick controls, etc.);

providing an Application Programming Interface enabling communication from a distal intelligence source to the gaming operating system;

communicating with the Application Programming Interface to functions and/or primary gaming states in the library of the gaming operating system; and compiling a program specific to at least one gaming application that is compatible with the gaming operating system.

The method may affect compiling of the program including writing a program that comprises gaming application specific commands that communicate with the gaming operating system. The method may be practiced in conjunction with a user manual with directions on accessing files in the library and is used by using specific commands in the user manual to access specific files or functions in the operating system through the Application Programming Interface.

For those software components which use PKI (public key infrastructure) for authentication of other components in the system, it is desirable to create a new pair of public/private keys for each software release. There are several reasons for this:

Matching software releases by version
Simplification of the regulatory approval process
Barrier to brute-force cracking techniques
Preventative security measures
Jurisdictional non-compatibility "Revving" is the process by which public or private keys are replaced in the OS ROM. Private keys are used to generate signatures and the public key is used to verify the signatures. This ordinarily is done every time that a new version of software is introduced into new gaming jurisdictions or even the same gaming applications to different jurisdictions.

In the software development process, small inconsistencies and incompatibilities will creep into an API as new features are added and changes are made to the internal workings of a software component. This is true especially in an embedded environment where it is not cost effective or space effective to have multiple sections of redundant code. One way to ensure that the devices in the field are using compatible software components is to somehow prevent incompatible versions from co-existing. Revving the public/private key pairs with each release of a trusted software component is one such method.

One significant delay in the introduction of gaming applications to the market has involved the complexity and length of regulatory approval. For example, consider a circumstance where there are hundreds of games deployed with a certain OS. Each of these games runs on a certain version of the software (most likely the latest version) but not necessarily so. When a new version of that OS is released, gaming regulations require that approval is obtained for all possible game configurations which exist in the field. This means that if every version of OS uses the same keys, it would be necessary to test and submit for approval every old game that existed in the field with old versions, because there would be no mechanism preventing someone from using an old version with new game code.

With a different key pair for every OS version, only new games would ever have to be submitted for approval, since the old games would automatically not work with the new keys and consequently, the new operating system.

If someone wanted to discover a private key and did not have a mathematical way of doing so (for the encryption technique described above, there are no such known methods) they would try to discover the key by guessing. This may be hard to do with a key length of 512 bits, but someone with a lot of computer power might eventually be able to guess the correct key. By using very long keys, this approach has been made as impractical as possible. For this reason, the more impractical it is to guess keys the better, as far as security of keys is concerned. Therefore, if new keys are generated every time a version of software is released, it will be that much more impractical for someone to try to guess the keys. This makes the overall system more secure.

One of the most important aspects to consider with the PKI method of using signatures for the verification of gaming chips is that regulatory agencies base their approval on the confidence that exists in maintaining the secrecy of the private key. Since anyone who might want to cheat the gaming application must modify the game code, if they do not know the private key, they will be unable to generate signatures for the gaming application to work. If a private key is lost, the integrity of every machine in the field which uses that public/private key set is compromised. The only way to correct this compromise in security is to generate a new public/private key pair and upgrade every machine with the new public key. If the same set of keys has been used for every software release, this means the manufacturer must generate a new public/private key pair and upgrade every version of OS in the field. With a different public/private key set for each OS version, only a subset of machines in the field will have to be upgraded if a key is compromised, which translates to less cost and less disruption to the casino's business.

Another important issue to consider is the fact that some manufacturers may use the same software component in several different jurisdictions. It is desirable to ensure that a gaming application written for one jurisdiction will not operate in a machine in a different jurisdiction. Also, vendors that are licensed in one jurisdiction should not have the keys to produce gaming applications for another jurisdiction. It will be desirable, therefore, to have different sets of keys for different gaming jurisdictions as well as for each software release.

When software components that exist on a system are the property of different vendors, complications arise in the case where one piece is found to have a serious security hole or other bug that causes the regulatory agency to have to disapprove the software. When any software component on a gaming device is disapproved, the gaming device as a whole will be disapproved. There are several issues with this set of circumstances, including at least liability, procedures and unlicensed vendor complications.

The timing of re-submission versus deadlines to remove the disapproved software from the field causes a potential liability issue when a bug fix cannot be found quickly enough. There should most likely be procedures that vendors should follow for tracking software installation and revisions in the field. Without such procedures, it would be impossible to do a coordinated software upgrade if the need arises.

If more than one software component interacts with a third component through the same API, there can be side effects known as couplings. For example, if a software function enables or disables a software feature, then an outside module could call the function to turn the feature on and a second module may then turn the feature off. Unless the two modules are communicating with each other, there will be problems with the two modules existing on the same system.

In systems where there is an OS/application relationship between software components, there can be a time coupling between all API calls, especially if there is an ability to preemptively multitask the application processes in the system. Because the multitasking can happen at any time, the order in which API calls can happen may change from run to run. This means that the application code needs a layer of error checking to prevent race condition bugs that would otherwise be unnecessary. For this reason, having a single thread of execution for which the order that API calls are made is always the same will automatically have a greater level of trust than will a multitasking QS. This is not to say that a multitasking OS cannot overcome this deficiency by correctly using mutexes, but this obviously is more complicated to test and therefore is harder to trust and obtain approval.

There can also exist couplings between API calls. These couplings are different from the interaction couplings pointed out earlier. These couplings are inherent in the way the API operates. The classic example of this type of coupling is the following API for a voltmeter:

Set_range (volts)

Set_sensitivity (volts_per_division)

The underlying parameters that are being controlled by both of these API calls are the minimum and maximum voltages that will be sensed by the voltmeter. However, at high voltage range settings, certain sensitivities may be unavailable due to the way the voltmeter senses voltages. This illustrates a functional coupling in an API. The generic way to describe these couplings is that one API call can affect the available settings or range of settings that are available to another API call.

One method of verifying software components is to define a series of regression tests and expected test results for the individual pieces. This method is useful for identifying programming errors and bounds checking problems with the API implementation, but is less useful in identifying system-level weaknesses which my be inherent in the design.

A front-end code verifier or pre-parser may be written that allows developer code to be scanned before compiling to identify errors in the code as it relates to the gaming operating system API. This type of scanner can be used to find couplings and other errors that a regression tester may not find.

In the past, vendor collaboration by defining a standard API specification in the gaming industry has been difficult and unsuccessful. A good example of this is the various protocol implementations that exist which are not always 100% compatible. With software components co-existing on the same machine, there can be no way around the fact that if something is not 100% compatible with the API specifications, there could easily be bugs introduced which would compromise the integrity of the device, which is clearly unacceptable in any jurisdiction.

For purposes of this disclosure, the following terms have specialized meaning, and are defined below:

"Memory" for purposes of this disclosure is defined as any type of media capable of read/write capability. Examples of memory are RAM, tape, flash memory, disc on chips and floppy disc.

"Shared or Game Program Objects" for purposes of this disclosure are defined as self-contained, functional units of game code that define a particular feature set or sequence of operation for a game. The personality and behavior of a gaming machine of the present invention are defined by the particular set of shared objects called and executed by the operating system. Within a single game, numerous game objects may be dynamically loaded and/or executed.

"Architecture" for purposes of this disclosure is defined as software, hardware or both.

"Dynamic Linking" for purposes of this disclosure is defined as linking at run time.

"API" for purposes of this disclosure is an Application Programming Interface. The API includes a library of functions.

"System Handler" for purposes of this disclosure is defined as a collection of code written to control non-gaming specific device handlers. Examples of device handlers include I/O, sound, video, touch screen, nonvolatile RAM and network devices.

"Gaming Data Variables" for purposes of this disclosure includes at a minimum any or all data needed to reconstruct the gaming state in the event of a power loss.

The present invention comprises various elements to enable the use and installation of a novel gaming operating system that in turn enables more rapid development and deployment of novel gaming games. One element of the invention is a computerized wagering game apparatus comprising:

a computerized game controller operable to control the computerized wagering game having a processor, memory, and nonvolatile storage; and an operating system comprising: a system handler application which provides gaming related functions and services to game programs; and an operating system kernel that executes the system handler application. The computerized wagering game apparatus may have the system handler application comprise at least one system selected from the group consisting of a) a plurality of device handlers, b) software having the ability when executed to:

load a gaming program and execute the new gaming program; c) an API with functions callable from the game program; d) an event queue; e) a game personality described in a selected mode; and f) a combination of an event queue that determines the order of execution of each specified device handler; an API having a library of functions; an event queue capable of queuing on a first come, first serve basis; and an event queue capable of queuing using more than one criteria. The computerized wagering game apparatus may have game data modified by gaming program objects that are stored in nonvolatile storage or wherein the system handler and kernel work in communication to hash system handler code and operating system kernel code. By way of non-limiting examples, the game data modified by gaming program objects may be stored in nonvolatile storage and changing game data in nonvolatile storage causes execution of a corresponding callback function in the system handler application. The computerized wagering game apparatus may have the operating system kernel as a Linux operating system kernel having customized proprietary modules and the kernel has at least one modification wherein each modification is selected from the group consisting of: 1) accessing user level code from ROM, 2) executing from ROM, 3) zeroing out unused RAM, 4) testing and/or hashing the kernel, and 5) disabling selected device handlers. The computerized wagering game apparatus may have the apparatus contain a machine-readable element with machine-readable instructions thereon, the instructions when executed operable to cause the processor to manage at least one gaming program object via a system handler application and to execute a single gaming program object at any one time, wherein gaming program objects are operable to share game data in nonvolatile storage within the processor in the computerized wagering game system.

The computerized wagering game apparatus may have programming direct the gaming apparatus to effect a procedure selected from the group consisting of a) only one gaming program object executes at any one time, b) there are instructions operable when executed to cause a computer to provide functions through an API that comprises a part of the system handler application, and c) when instructions are executed, the instructions are operable to store game data in nonvolatile storage, such that the state of the computerized wagering game system is maintained when the machine loses power.

A method of assisting in the development of a computer based wagering gaming application can utilize any of the apparatus described herein by the steps of:

providing a gaming operating system comprising a library of at least two software gaming callback functions and/or primary gaming states;

providing an Application Programming Interface enabling communication from a distal intelligence source to the gaming operating system;

communicating with the Application Programming Interface to the functions and/or primary gaming states in the library of the gaming operating system by providing a Makefile or other procedure for building a gaming application, and a configuration file for running the gaming operation system on a proximal computing system;

providing gaming specific data relating to at least one specific gaming application; and compiling a program specific to at least one gaming application that is compatible with the gaming operating system.

This method of assisting in the development of a computer based wagering gaming application may also comprise using a library of at least two software gaming elements comprising gaming elements selected from the group consisting of random number generator, game initiation sequence, bonus module, video gaming module, audio gaming module, jackpot module, graphics conversion tool, debugging tool, payout table module, value-handling module, power-loss recovery module, gaming payout history module, player history module, and user interaction module. Also, the process may have public and/or private authentication keys revved and different public and/or private authentication keys are provided to each of at least two different legal jurisdictions.

A method of managing data in a computerized wagering game apparatus as described herein can be practiced via a system handler application in a method of loading a shared object, executing the shared object, and accessing and storing game data in nonvolatile storage. This method may have further steps of a) unloading the first program object, and loading a second program object or b) executing a corresponding callback function upon alteration of game data in nonvolatile storage.

The present invention also includes a machine-readable memory storage element with instructions thereon, the instructions when executed operable to cause a computer to: load a first program shared object, execute a first program shared object, store gaming data in nonvolatile storage, such that a second program object later loaded can access gaming data variables in nonvolatile storage, unload the first program shared object from system memory, and load the second program shared object to system memory so that the second program shared object is accessible to the computer as instructions. This machine-readable memory storage element may have additional instructions operable when executed to cause a computer to perform a task selected from the group consisting of a) executing a corresponding callback function upon alteration of game data in the nonvolatile storage; and b) managing events via the system handler application.

Another aspect of the present invention includes a universal operating system stored in a memory storage component that may be operatively inserted along with game identity data into an electronic or electromechanical gaming device having ancillary functions so that the gaming device can effect play of the game provided in the game identity data. The operating system will control at least one ancillary function selected from the group consisting of coin acceptance, credit acceptance, currency acceptance and boot up, the gaming device having at least one system handler application, and the operating system comprising a system handler and an operating system kernel. This operating system may also have at least one of a plurality of APIs, an operating system kernel customized for gaming purposes, and an event queue, or a system handler having a plurality of device handlers or the operating system controls a networked on-line system or control a progressive meter. The operating system may also have a kernel customized for gaming purposes utilizing a method of operation selected from the group consisting of: 1) accessing user level code from ROM, 2) executing from ROM, 3) zero out unused RAM, 4) test and/or hash the kernel, and 5) disabling selected device handlers.

Another method within the scope of the invention can be generally described as a) customizing an operating system kernel and b) providing the customized kernel of the operating system into a gaming apparatus, at least one customization being effected to obtain functionality of the gaming apparatus, the customization being a kernel modification for a process selected from the group consisting of:

1) accessing user level code from ROM;
2) executing user level code from ROM;
3) zeroing out unused RAM;
4) testing and/or hashing the kernel; and
5) disabling selected device handlers.

Another method within the scope of the invention can be generally described as converting a first game that operates on a first gaming system so that the game operates on a universal gaming system, the method comprising: removing a first game operating system from the gaming system, the first game operating system including hardware and software; installing the universal gaming system in place of the game operating system, the universal gaming system including a game program layer, an open operating system, and a game controller for running the game program layer on the open operating system; providing functional interfaces between the universal gaming system and game devices; and installing a second game specific program in the game program layer configured to operate with the open operating system. This method may have at least one step selected from the group consisting of:

a) providing the open operating system with a system application handler, wherein the functional interfaces include a functional interface between the gaming system and the game devices via the system application handler;
b) configuring the system handler application to include one or more device handlers for interfacing with the game devices, wherein at least one of the device handlers operates as a protocol manager between the games device and the open operating system;
c) providing the open operating system to include an operating system kernel that executes the system handler application; and
d) providing the game program layer with at least one gaming program object.

This method may have the at least one gaming program object specific to a type of game played on the universal gaming system. The method may also have at least one step selected from the group consisting of:

changing a type of game played on the universal gaming system by changing game program objects;
configuring the game program layer to operate the game as a slot machine;
operating the slot machine as a mechanical reel-based slot machine; and
configuring the open operating system to include a resource manager for mapping game specific resources.

This method may include mapping game specific resources by parsing a configuration file, mapping operating system resources based on the configuration file, and storing the resource map in memory. This mapping of the operating system resources may be based on the configuration file includes mapping input/output lines to system resources. The method may enable converting the first gaming system from a cash accepting gaming system to a cashless gaming system, the method including providing the open operating system with a system application handler, wherein the functional interfaces include a functional interface between the gaming system and the game devices accomplished via the system application handler, and configuring the system handler application to include one or more device handlers for interfacing with the game devices, the configuring including installing a card reader device handler, and installing a card reader in communication with the card reader device handler, and optionally including configuring the system handler application to include a ticket printer device handler; and installing a ticket printer in communication with the ticket printer device handler. This method may be practiced, by way of a non-limiting example on a slot machine game operating system that is removed from the first gaming system and where the functional interfaces are between the universal gaming system and slot machine game devices. This method may also perform at least one step selected from the group consisting of: a) providing the open operating system with a system application handler, wherein the functional interfaces include a functional interface between the gaming system and the slot machine game devices via the system application handler; b) configuring the system handler application to include one or more device handlers for interfacing with the slot machine game devices, wherein at least one of the device handlers operates as a protocol manager between the slot machine games device and the open operating system; c) configuring an I/O device handler to interface with slot machine input devices and slot machine output devices; d) providing slot machine input devices that include a mechanical arm, button acceptor and coin acceptor; and e) providing the slot machine with output devices inclusive of slot machine reels, credit displays, and speakers. The method may act to convert the mechanical reel slot machine game having only cash, token, credit balance and currency acceptance capability to a cashless gaming system via the system handler application, the converting including providing a card reader device handler, and installing a card reader in communication with the card reader device handler and optionally providing a ticket printer device handler, and installing a ticket printer in communication with the ticket printer device handler.

Another aspect of the method of the present invention is a method of configuring a game program layer for a universal gaming system that is configured for a game program layer and an open operating system, the method comprising: configuring the game program layer on a computer remote from a first non-universal gaming system; and downloading the game program layer into the universal gaming system and performing at least one sequence comprising:

a) defining a game template; and configuring the game program layer using the game template;
b) storing the game program on a removable media card; and
c) providing removable media as flash memory.

This method may be practiced, for example, where the game program is stored on a removable media card and the removable media card is plugged into the gaming system, and then running the game program layer via the open operating system from the removable media card. This method may also have an additional step of preparing the game program layer for authentication by plugging the removable media card into an authenticating system. This method may be performed, in a non-limiting example, as a network based method of providing a game program layer for a universal gaming system configured for remote operation using an open operating system, the method including defining a user interface to communicate between the remote computer and the universal operating system. For example, the game program layer is configured to use user interface remote from the gaming system or via a web page template at the user interface.

The present invention may also comprise a gaming system suitable for use in a casino comprising: a game controller configured to operate the gaming system; and a first nonvolatile memory and a second nonvolatile memory for storing critical gaming information, wherein the first nonvolatile memory and the second nonvolatile memory are configured to communicate with the game controller as a gaming RAID system for redundant storage of critical gaming information. RAID not defined in text, the gaming system enabling redundant NVRAM storage to be replaceable while operating power for the system is on.

The present invention includes a method of accessing a computerized gaming operating system by a method and apparatus. The operating system has novel gaming-specific features that improve security, make development of game code more efficient, and do so using an apparatus and software methods that are cost-effective and efficient. The present invention also reduces the amount of effort required to evaluate and review new game designs by gaming regulators, because the amount of code to be reviewed for each game is reduced by at least as much as 40%, preferably at least 50%, more preferably at least 60% or even at least 10%, and as much as 80% or more over known, machine-specific architecture that one skilled in the art might wish to insert into gaming systems. That is, in the practice of the present invention, rather than having every line of code or software screened, certain software is essentially 'pre-approved' by previous inspection and only game code additions (and the like) need to be reviewed for approval. The invention provides, in various embodiments, features such as a nonvolatile memory for storing gaming application variables and game state information, provides a shared object architecture that allows individual game objects to be loaded and to call common functions provided by a system handler application, and in one embodiment provides a custom operating system kernel that has selected device handlers disabled.

Incorporated by reference in this description is the Shuffle Master Gaming, Game Operating System "SGOS" Developer's Manual, revised May 2001 comprising 175 pages that are attached hereto and incorporated herein as part of this specification. This Developer's Manual has not been published, but has been provided under limited access under confidentiality agreements with potential developers, and does not constitute prior art. No commercial products have been introduced using this manual or the development procedures and systems of the present invention as of 10 Sep. 2001.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. Credit for wagering may be established via coin or token slot 104, a device 105 such as a bill receiver or card reader, or any other credit input device. A card reader 105 may also provide the ability to record credit information on a user's card when the user has completed gaming, or credit may be returned via a coin tray 106 or other credit return device. Information is provided to the user by devices such as video screen 107, which may be a cathode ray tube (CRT), liquid crystal display (LCD) panel, plasma display, light-emitting diode (LED) display, mechanical reels or wheels or other display device that produces a visual image under control of the computerized game controller. Also, buttons 101 may be lighted to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, to provide player instructions or for other purposes, under the control of the computerized game controller.

The gaming system 100 further comprises a computerized game controller 111 and I/O interface 112, connected via a wiring harness 113. The universal game controller 111 need not have its software or hardware designed to conform to the interface requirements of various gaming system user interface assemblies, but can be designed once and can control various gaming systems via the use of machine-specific I/O interfaces 112 designed to properly interface an input and/or output of the universal computerized game controller to the harness assemblies found within the various gaming systems.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus that is an example of a modular computer system that features a compact size and low power consumption while retaining PC software and hardware compatibility. The universal game controller 111 provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software. Examples of special purpose elements include elements that are heat resistant and are designed to operate under less than optimal environments that might contain substances such as dust, smoke, heat and moisture. Special purpose elements are also more reliable when used 24 hours per day, as is the case with most gaming applications.

The computerized game controller of some embodiments of the present invention is a computer running an operating system with a gaming application-specific kernel. In alternative or further embodiments, a game engine layer of code executes within a non-application specific kernel, providing common game functionality. The gaming program shared object in such embodiments is therefore only a fraction of the total code, and relies on the game engine layer and operating system kernel to provide a library of gaming functions. A preferred operating system kernel is the public domain Linux 2.2 kernel available on the Internet. Still other embodiments will have various levels of application code, ranging from embodiments containing several layers of game-specific code to a single-layer of game software running without an operating system or kernel but providing its own computer system management capability.

Figure 2:
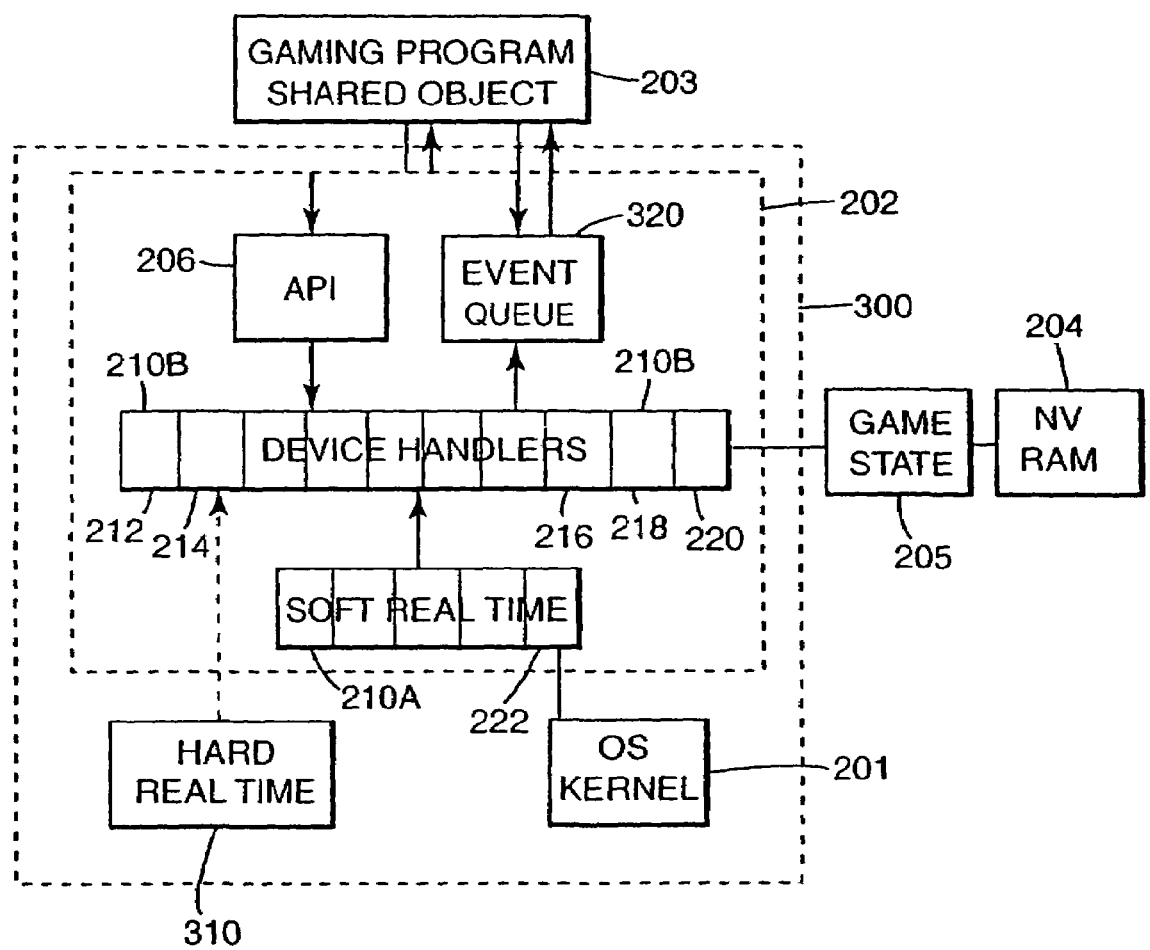
FIG. 2 shows a more detailed structure of program code executed on a computerized wagering game apparatus, consistent with an embodiment of the present invention.

FIG. 2 illustrates the structure of one exemplary embodiment of the invention, as may be practiced on a computerized gaming system such as that of FIG. 1. The invention includes an operating system 300, including an operating system kernel 201 and a system handler application 202. An operating system kernel 201 is first executed, after which a system handler application 202 is loaded and executed. The system handler application in some embodiments may load a gaming program shared object 203, and may initialize the game based on gaming data variables stored in nonvolatile storage 204. In some embodiments, the gaming data variables are mapped using a Game.State data file 205, which reflects the data stored in nonvolatile storage 204. The nonvolatile RAM (NV-RAM) according to the invention has read/write capability. The gaming program object in some embodiments calls separate API functions 206, such as sound functions that enable the gaming apparatus to produce sound effects and music.

The OS kernel 201 in some embodiments may be a Linux kernel, but in alternate embodiments may be any other operating system providing a similar function. The Linux 2.2 operating system kernel in some further embodiments may be modified for adaptation to gaming architecture. Modifications may comprise erasing or removing selected code from the kernel, modifying code within the kernel, adding code to the kernel or performing any other action that renders certain device handler code inoperable in normal kernel operation. By modifying the kernel in some embodiments of the invention, the function of the computerized gaming apparatus can be enhanced by incorporating security features, for example. In one embodiment, all modifications to the kernel are of the form of proprietary kernel modules loadable at run-time.

In one embodiment, the system is used to execute user level code out of ROM. The use of the Linux operating system lends itself to this application because the source code is readily available. Other operating systems such as Windows and DOS are other suitable operating systems.

Embodiments of the invention include hard real time code 310 beneath the kernel providing real time response such as fast response time to interrupts. The hard real time code 310 is part of the operating system in one embodiment.

In one embodiment of the invention, all user interface peripherals such as keyboards, joysticks and the like are not connected to the architecture so that the operating system and shared objects retain exclusive control over the gaming machine. In another embodiment, selected device handlers are disabled so that the use of a keyboard, for example, is not possible. It is more desirable to retain this functionality so that user peripherals can be attached to service the machine. It might also be desirable to attach additional user peripherals such as tracking balls, light guns, light pens and the like.

In another embodiment, the kernel is further modified to zero out all unused RAM. This function eliminates code that has been inserted unintentionally, such as through a Trojan horse, for example.

In one embodiment, the kernel and operating system are modified to hash the system handler and shared object or gaming program object code or both, and to hash the kernel code itself. These functions in different embodiments are performed continuously, or at a predetermined frequency.

The system handler application is loaded and executed after loading the operating system, and manages the various gaming program shared objects. In further embodiments, the system handler application provides a user Application Program Interface (API) 206 that includes a library of gaming functions used by one or more of the shared objects 210. For example, the API in one embodiment includes functions that control graphics, such as color, screen commands, font settings, character strings, 3-D effects, etc. The device handler callbacks 210 are preferably handled by an event queue 320. The event queue schedules the event handlers in sequence. The shared object 203 calls the APIs 206 in one embodiment. The system handler application 202 in various embodiments also manages writing of data variables in the "game.state" file 205 into the nonvolatile storage 204, and further manages calling any callback functions associated with each data variable changed.

The system handler 202 application of some embodiments may manage the gaming program shared objects by loading a single object at a time and executing the object. When another object needs to be loaded and executed, the current object may remain loaded or can be unloaded and the new object loaded in its place before the new object is executed. The various shared objects can pass data between objects by storing the data in nonvolatile storage 204. For example, a "game.so" file may be a gaming program object file that is loaded and executed to provide operation of a feature set of a computerized wagering game, while a "bonus.so" gaming program object file is loaded and executed to provide a feature set of the bonus segment of play. Upon changing from normal game operation to bonus, the bonus.so is loaded and executed upon loading. Because the relevant data used by each gaming program object file in this example is stored in nonvolatile storage 204, the data may be accessed as needed by whatever gaming program object is currently loaded and executing.

The system handler application in some embodiments provides an API that comprises a library of gaming functions, enabling both easy and controlled access to various commonly used functions of the gaming system. Providing a payout in the event of a winning round of game play, for example, may be accomplished via a payout function that provides the application designer's only access to the hardware that pays out credit or money. Restrictions on the payout function, such as automatically reducing credits stored in nonvolatile storage each time a payout is made, may be employed in some embodiments of the invention to ensure proper and secure management of credits by the computerized gaming system. The functions of the API may be provided by the developer as part of the system handler application, and may be a part of the software provided in the system handler application package. The API functions may be updated as needed by the provider of the system handler application to provide new gaming functions as desired. In some embodiments, the API may simply provide functions that are commonly needed in gaming, such as computation of odds or random numbers, an interface to peripheral devices, or management of cards, reels, video output or other similar functions.

The system handler application 202 in various embodiments also comprises a plurality of device handlers 210 that monitor for various events and provide a software interface to various hardware devices. For example, some embodiments of the invention have handlers for nonvolatile memory 212, one or more I/O devices 214, a graphics engine 216, a sound device 218, or a touch screen 220. Also, gaming-specific devices such as a pull arm, credit receiving device or credit payout device may be handled via a device handler 222. Other peripheral devices may be handled with similar device handlers, and are to be considered within the scope of the invention. In one embodiment, the device handlers are separated into two types. The two types are: soft real time 210A and regular device handlers 210B. The two types of device handlers operate differently. The soft real time handler 210A constantly runs and the other handler 210B runs in response to the occurrence of events.

The nonvolatile storage 204 used to store data variables may be a file on a hard disc, may be nonvolatile memory, or may be any other storage device that does not lose the data stored thereon upon loss of power. In one embodiment the nonvolatile storage is battery-backed RAM. In another embodiment, the non-volatile storage is flash memory. The nonvolatile storage in some embodiments may be encrypted to ensure that the data variables stored therein cannot be corrupted. Some embodiments may further include a game.state file 205, which provides a look-up table for the game data stored in nonvolatile storage 204. The game.state file is typically parsed prior to execution of the shared object file. The operating system creates a map of NVRAM by parsing the game.state file. The look-up table is stored in RAM. This look-up table is used to access and modify game data that resides in NVRAM 204. This game data can also be stored on other types of memory.

In some embodiments, a duplicate copy of the game data stored in NVRAM 204 resides at another location in the NVRAM memory. In another embodiment, a duplicate copy of the game data is copied to another storage device. In yet another embodiment, two copies of the game data reside on the NVRAM and a third copy resides on a separate storage device. In yet another embodiment, three copies of the game data reside in memory. Extra copies of the game data are required by gaming regulations in some jurisdictions.

Data written to the game state device must also be written to the nonvolatile storage device, unless the game state data device is also nonvolatile, to ensure that the data stored is not lost in the event of a power loss. For example, a hard disc in one embodiment stores a file that contains an unencrypted and nonvolatile record of the encrypted data variables in nonvolatile storage flash programmable memory (not shown). Data variables written in the course of game operation may be encrypted and stored in the nonvolatile storage 204, upon normal shutdown. Loss of power leaves a valid copy of the most recent data variables in the non-volatile storage.

In an alternate embodiment, a game state device 205 such as a game.state file stored on a hard disc drive provides variable names or tags and corresponding locations or order in nonvolatile storage 204, in effect, providing a variable map of the nonvolatile storage. In one such embodiment, the nonvolatile storage may then be accessed using the data in the game state file 205, which permits access to the variable name associated with a particular nonvolatile storage location. Such a method permits access to and handling of data stored in nonvolatile storage using variable names stored in the game state file 205, allowing use of a generic nonvolatile storage driver where the contents of the nonvolatile storage are game-specific. Other configurations of nonvolatile storage such as a single nonvolatile storage are also contemplated, and are to be considered within the scope of the invention.

Callback functions that are managed in some embodiments by the system handler application 202 may be triggered by changing variables stored in NVRAM 204. For each variable, a corresponding function may be called that performs an action in response to the changed variable. For example, every change to a "credits" variable in some embodiments calls a "display_credits" function that updates the credits as displayed to the user on a video screen. The callback function may be a function provided by the current gaming program shared object or can be called by a different gaming program object.

The gaming program's shared objects in some embodiments of the invention define the personality and function of the game. Program objects provide different game functions, such as bookkeeping, game operation, game setup and configuration functions, bonus displays and other functions as necessary. The gaming program objects in some embodiments of the invention are loaded and executed one at a time, and share data only through NVRAM 204 or another game data storage device. The previous example of unloading a game.so gaming program object and replacing it with a bonus.so file to perform bonus functions is an example of such use of multiple gaming program shared objects.

Each gaming program object may require certain game data to be present in NVRAM 204, and to be usable from within the executing gaming program shared object 203. The game data may include meter information for bookkeeping, data to recreate game on power loss, game history, currency history, credit information, and ticket printing history, for example.

The operating system of the present application is not limited to use in gaming machines. It is the shared object library rather than the operating system itself that defines the personality and character of the game. The operating system of the present invention can be used with other types of shared object libraries for other purposes.

For example, the operating system of the present invention can be used to control networked on-line systems such as progressive controllers and player tracking systems. The operating system could also be used for kiosk displays or for creating "picture in picture" features in gaming machines. A gaming machine could be configured so that a video slot player could place a bet in the sports book, then watch the sporting event in the "picture in picture" feature while playing his favorite slot game.

The present invention provides a computerized gaming apparatus and method that provides a gaming-specific platform that features reduced game development time and efficient game operation via the use of a system handler application that can manage independent gaming program objects and gaming-specific API, provides game functionality to the operating system kernel, provides security for the electronic gaming system via the nonvolatile storage and other security features of the system, and does so in an efficient manner that makes development of new software games relatively easy. Production and management of a gaming apparatus is also simplified, due to the system handler application API library of gaming functions and common development platform provided by the invention.

Figure 3:
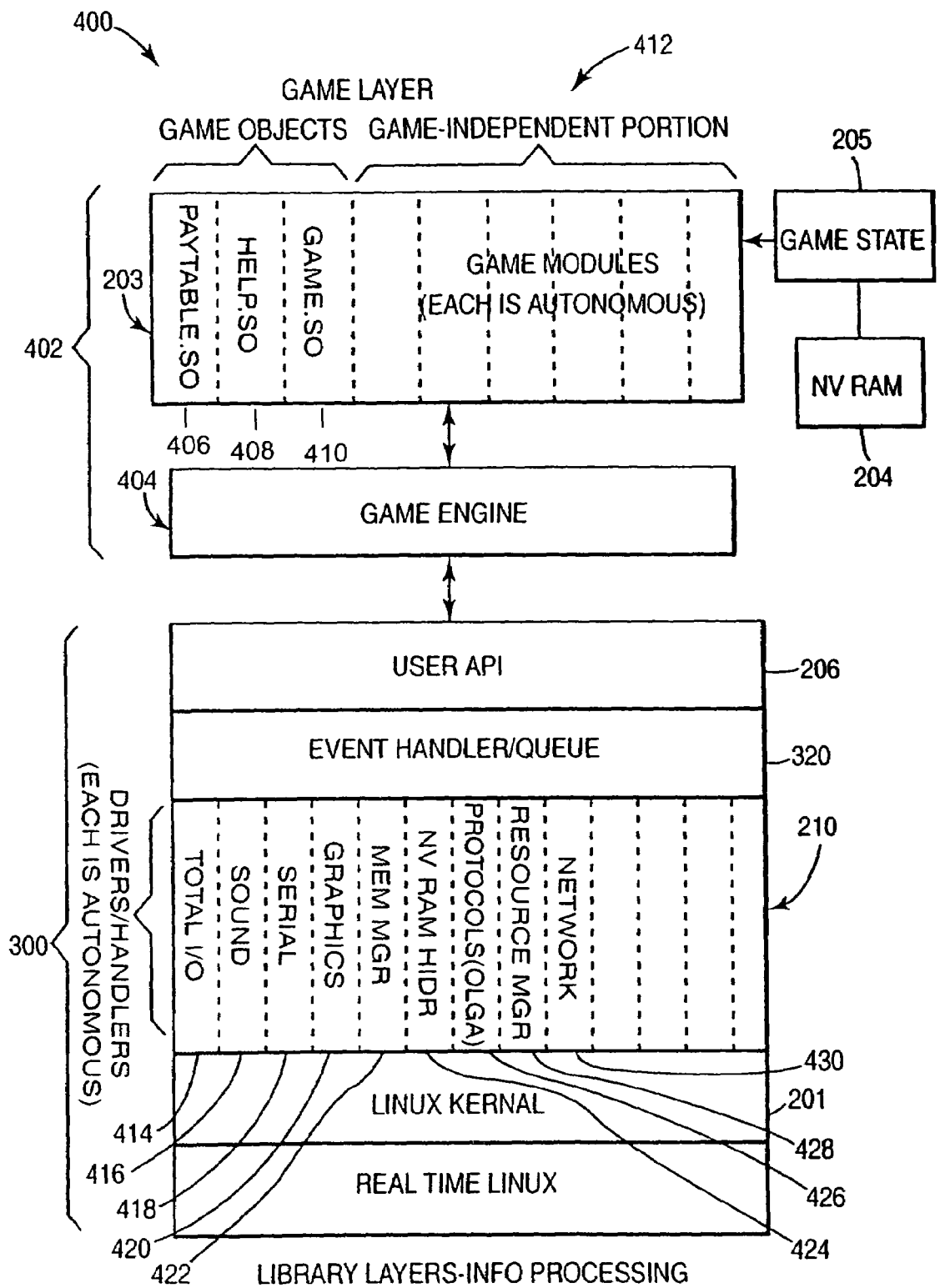
FIG. 3 is a diagram illustrating another exemplary embodiment of a universal gaming system according to the present invention having a universal or open operating system.

FIG. 3 is a diagram illustrating one exemplary embodiment of a gaming system 400 according to the present invention including universal operating system 300. As previously described herein, game layer 402 includes gaming program shared objects 203 which are specific to the type of game being played on gaming system 400. Exemplary game objects or modules include paytable.so 406, help.so 408 and game.so 410. Game layer 402 also includes other game specific independent modules 412. Game engine 404 provides an interface between game layer 402 and universal operating system 300. The game engine 404 provides an additional application programming interface to the game layer application. The game engine 404 automates core event handling for communicating with the game operating system 300, and which are not configurable via the specific game layer game code. The game engine 404 also provides housekeeping and game state machine functions. The game layer objects 203 and/or modules 406, 408, 410 may also directly call user API 206.

As previously described herein universal operating system 300 is an open operating system which allows for conversion of the gaming system 400 into different types of games, and also allows for future expandability and upgrading of associated hardware in the gaming system 400 due to its open architecture operating system.

In operating system 300, device handlers 210 provide the interface between the operating system 300 and external gaming system input and output devices, such as a button panel, bill acceptor, coin acceptor, mechanical arm, reels, speaker, tower lights, etc. Each device handler 210 is autonomous to the other. The device handlers or drivers 210 operate as protocol managers, which receive information from a gaming system device (typically in the gaming system device protocol) and convert the information to a common open operating system protocol usable by operating system 300. Similarly, the device drivers or handlers 210 receive information from the open operating system and convert the information to a gaming device specific protocol. The specific device handlers or drivers used are dependent upon what game you are using, and may be loadable or unloadable as independent, separate objects or modules. The exemplary embodiment shown includes total I/O device handler 414, sound device handler 416, serial device handler 418, graphics device handler 420, memory manager device handler 422, NVRAM device handler 424, protocols device handler 426, resource manager device handler 428 and network device handler 430. Other suitable device handlers for adapting the operating system 300 to other gaming systems will become apparent to one skilled in the art after reading the present application.

Figure 4:
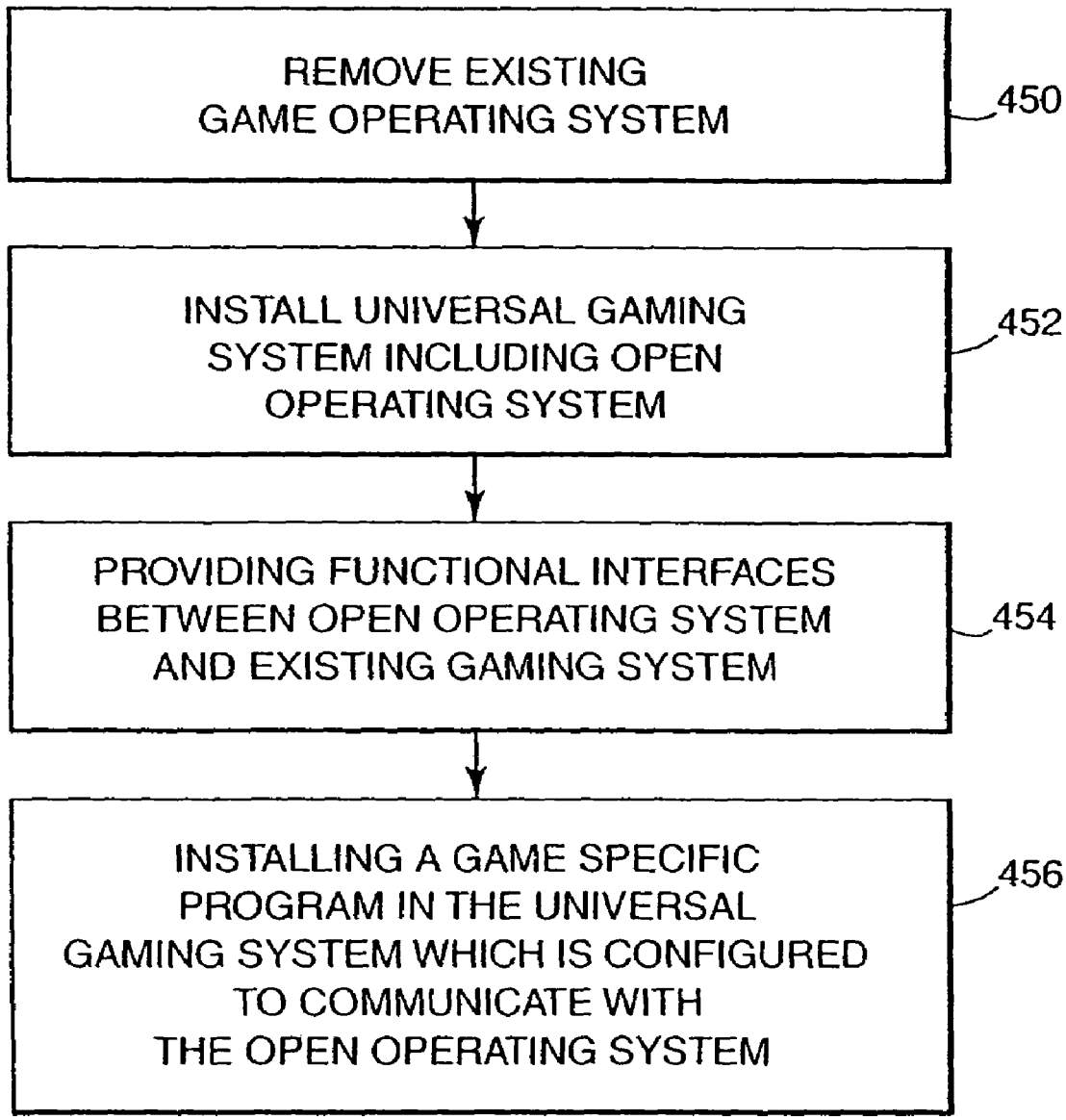
FIG. 4 is a diagram illustrating one exemplary embodiment of a method of converting a gaming system to a gaming system having an open operating system according to the present invention.

FIG. 4 is a diagram illustrating one exemplary embodiment of a method of converting an existing gaming operating system to a gaming system 400 having an open operating system 300 according to the present invention. The gaming system 400 according to the present invention is suitable for converting both video based gaming systems and also electrical/mechanical based operating system, such as a mechanical reel based slot machine, and combinations of the two in a unit (by way of a non-limiting example, where one system is an underlying game and the other system is a bonus, jackpot or contemporaneous game). Once the existing game operating system has been changed over to a universal gaming system 400 having a universal operating system 300 according to the present invention, the type of game itself may be changed via changing out the game specific code in the game layer 402.

At 450, the existing game operating system is removed from the game. The existing game operating system is typically a proprietary operating platform consisting of computer hardware and software which is specific to the game being changed out. At 452, a universal gaming system 402 including an open operating system 300 is installed in the game. At 454, functional interfaces are provided between the open operating system and the existing gaming system devices. At 456, a game specific program (i.e., game layer 402) is installed in the universal gaming system. The game specific program is configured to communicate with the open operating system 300.

In one exemplary embodiment, the gaming system according to the present invention is used in a mechanical reel-based slot machine, either in a new slot machine or in converting an existing slot machine to an open operating system according to the present invention. Exemplary conventional reel-based slot machines include an IGT S-plus slot machine or a Bally™ slot machine.

Figure 5:
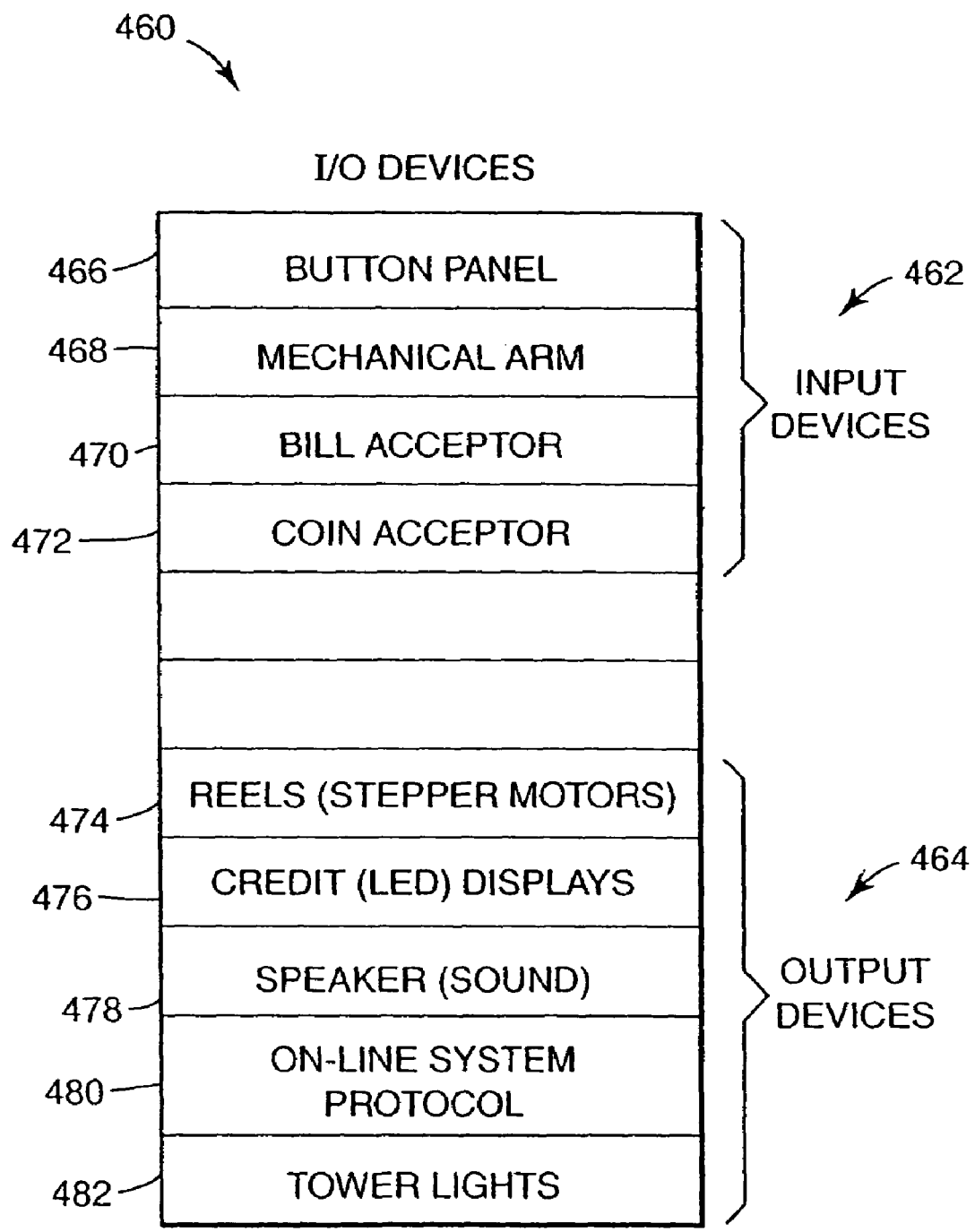
FIG. 5 is a diagram illustrating one exemplary embodiment of a set of devices used for interfacing with a device driver or handler in an open operating system in a gaming system according to the present invention.

FIG. 5 is a diagram illustrating one exemplary embodiment of I/O devices which must be functionally interfaced within adopting gaming system 402 to a reel-based game. The exemplary embodiment shown includes devices which interface with a digital I/O device driver. In one embodiment, input devices 462 includes a button panel device 466, a mechanical arm device 468, a bill acceptor device 470, and a coin acceptor device 472. Each of the input devices 462 receives information from the specific game devices and provides the information to the gaming system 400 via the I/O device driver.

Output devices 464 receive information from operating system 300 which provides an output via the I/O device driver to gaming devices 464. In the example shown, output devices 464 include reels device 474 which receives an output to the stepper motors controlling the reels. Credit displays device 476 which receives an output to the LED driven credit displays. Speaker device 478 which receives a sound output to the game speakers. On-line system protocol devices 480 are communication interfaces between the open operating system 300 and the game on-line system. Tower light devices 482 receive an interface between the open operating system 300 and the game tower lights.

Figure 6:
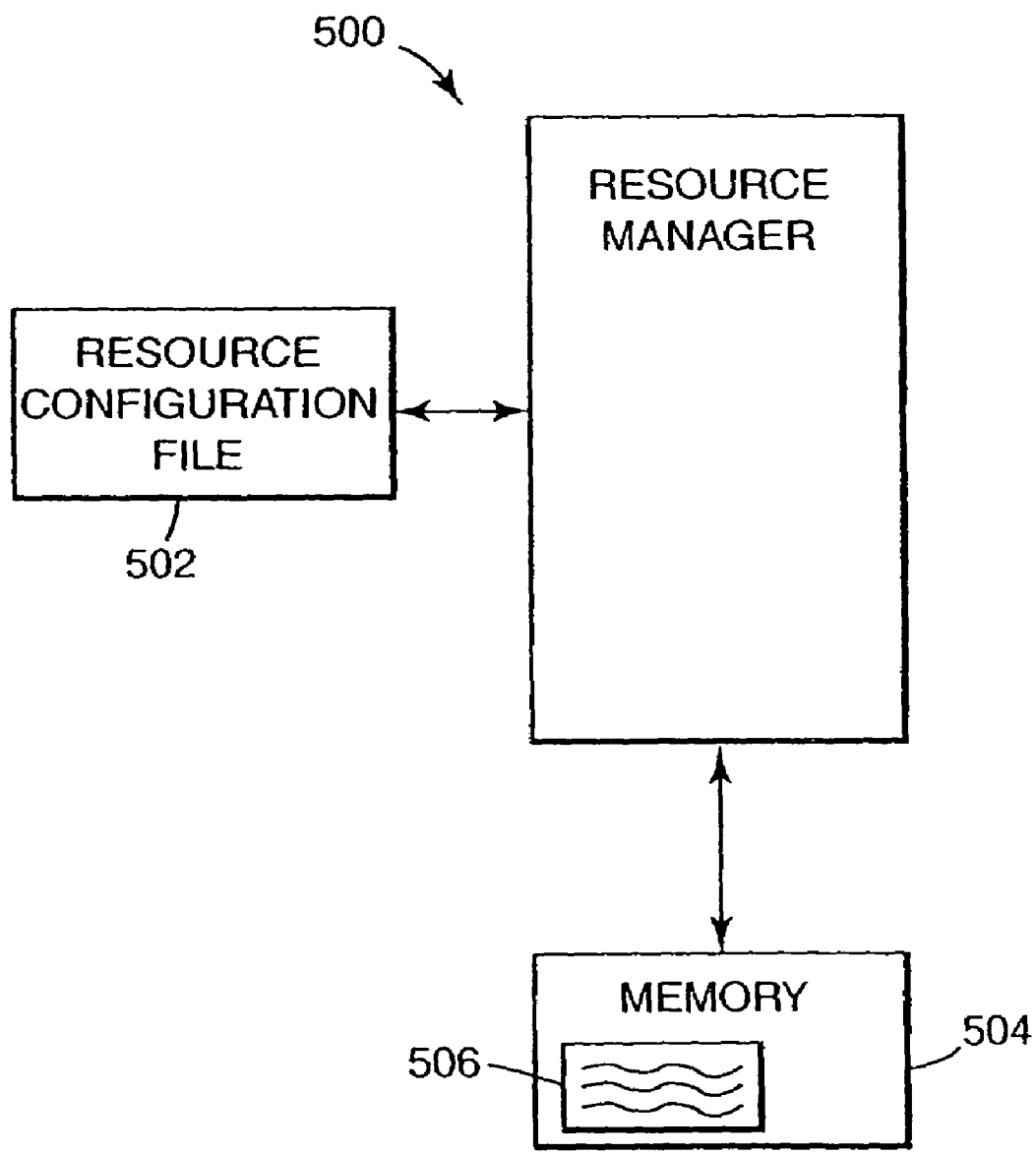
FIG. 6 is a diagram illustrating one exemplary embodiment of a resource manager used in a gaming system according to the present invention.

FIG. 6 is a diagram illustrating one exemplary embodiment of a resource manager used in a gaming system according to the present invention. The resource manager 500 is a software module which receives a resource configuration file 502 and stores it in memory 504. In one aspect, memory 504 is stored in nonvolatile memory, which in one embodiment is flash memory. The resource manager parses the resource configuration file and stores individual resources in memory for fast recall.

In one embodiment, the resource manager 500 stores the file 502 in the form of a lookup table. In one preferred embodiment, the resource manager reads the configuration files at startup, parses the configuration files and stores them in memory 504. The resource manager file 506 may then be accessed by the rest of the operating system 300 software applications. The resource manager operates to map digital I/O lines, corn ports, game specific resources, kernel modules to load, etc.

Figure 7:
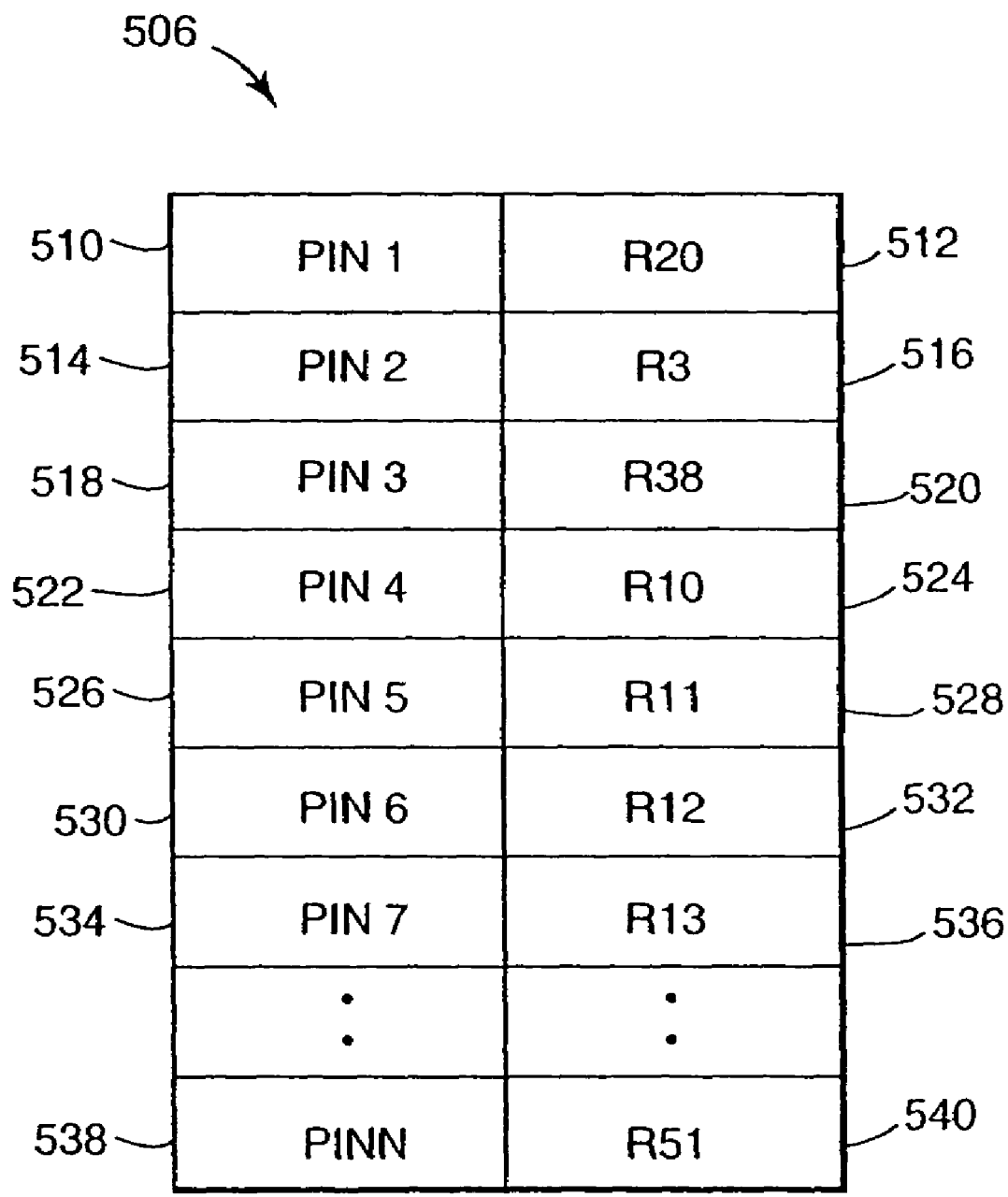
FIG. 7 is a diagram of a table illustrating one exemplary embodiment of a resource file used in a gaming system according to the present invention.

FIG. 7 is a diagram of a table illustrating one exemplary embodiment of a portion of a resource file 506 according to the present invention. The resource manager 500 operates to map the input/output (I/O) line to the operating system resources. Instead of changing pin locations for different games, the resource manger provides for mapping of I/O lines via software. In one aspect, 64, I/O (X8) lines are mapped to the various operating system resources. In one aspect, the I/O line at PIN#1 510 is mapped to resource R20 512; and PIN#2 514 is mapped to resource R3 516; PIN#3 518 is mapped to resource R38 520; PIN#4 522 is mapped to resource R10 524; PIN#5 526 is mapped to resource R11 528; PIN#6 530 is mapped to resource R12 532; PIN#7 534 is mapped to resource R13 536; and PIN#N 538 is mapped to resource R51 540, etc.

The gaming system 400 according to the present invention is adaptable for use as a cashless gaming system. As such, it is useable for converting existing coin-based or token-based gaming systems into a cashless gaming system.

Figure 8:
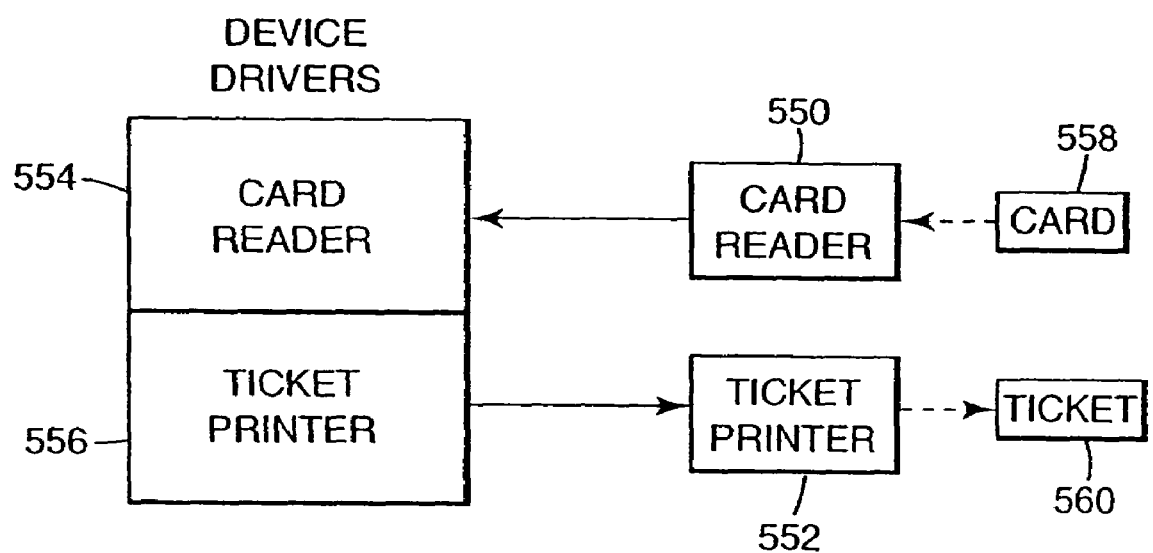
FIG. 8 is a diagram illustrating one exemplary embodiment of a cashless gaming system using the universal gaming system according to the present invention.

FIG. 8 is a diagram illustrating one exemplary embodiment of converting cash, coin, or token-based gaming system to a cashless gaming system using the universal gaming system 400 according to the present invention. References also made to FIGS. 1-7 previously described herein. A card reader or coupon acceptor 550 and ticket printer 552 are added to the game. The card reader 550 and ticket printer 552 are easily adaptable to interface with the gaming system 400 according to the present invention. In particular, card reader device driver 554 is added to open operating system 300 to enable card reader 550 to communicate with the operating system.

Similarly, a ticket printer device driver 556 is added to the operating system 300 in order to allow ticket printer 552 to communicate with the operating system. For example, an existing cash-based reel slot machine can be converted according to the present invention to a cashless gaming system. The card reader 550 can operate to read credit cards, magnetic strip based cards, or accept coupons which includes credits such as promotional gaming credits received from a casino. The card or coupons may be obtainable from a central or kiosk location. Once play is complete on the gaming system 400, the ticket printer 556 is operable to print a ticket representative of the amount of credits or money won on the gaming system. The ticket 560 may then be used as a card or coupon in another gaming system, or alternatively, may be turned in at a kiosk or central location for money.

Figure 9:
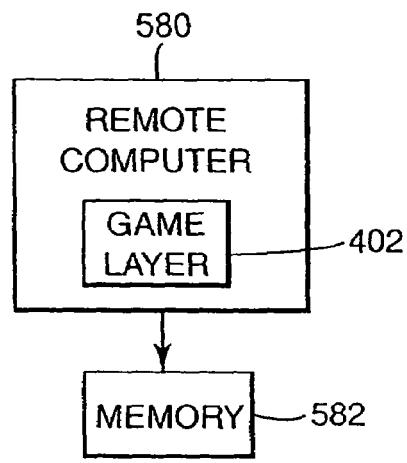
FIG. 9 is a diagram illustrating one exemplary embodiment of configuring a game usable in a gaming system according to the present invention.

FIG. 9 is a diagram illustrating another exemplary embodiment of the gaming system 400 according to the present invention. Due to the open operating system 300, game layer 402 may be configurable remote from the gaming system 400, such as on a remote computer or laptop computer 580. Game layer 402 is constructed into game objects or modules 302. As such, templates for specific types of games are configured to allow a game programmer to specify game specific configurable options from a remote computer 580. In another aspect, game specific modules are created on the remote computer 580. The game layer is then assembled and transferred into memory 582. In one aspect, memory 582 is nonvolatile memory located in the gaming system 400. In one aspect, the nonvolatile memory is flash memory. In one exemplary embodiment, the flash memory is a "Disk on a Chip", wherein the game layer 402 is downloaded from the remote computer 580 onto the disk on a chip 582.

Figure 10:
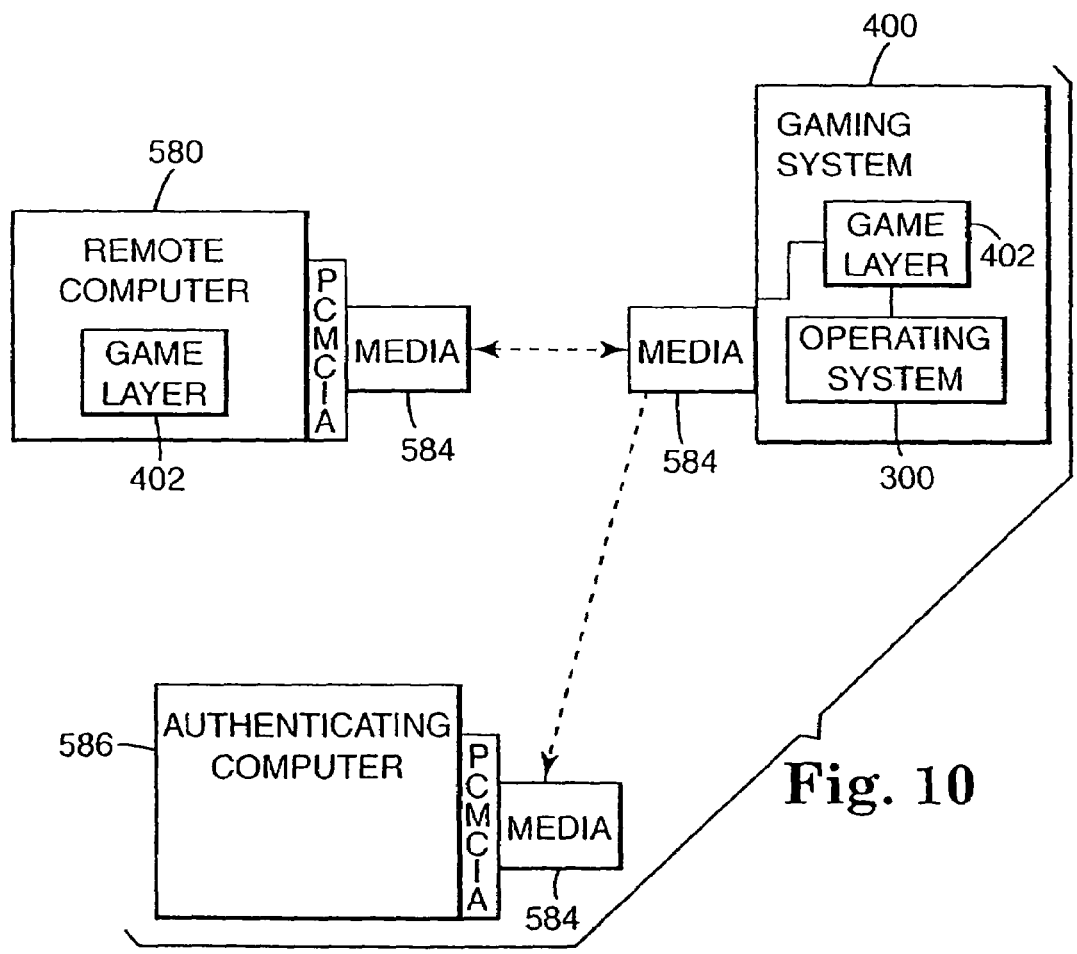
FIG. 10 is a diagram illustrating another exemplary embodiment of configuring and/or storing a game on a removable media useable in a gaming system according to the present invention.

FIG. 10 is a diagram illustrating another exemplary embodiment of programming and/or configuring a game layer at a location remote from the gaming system 400. In this embodiment, game layer 402 is programmed or configured on remote computer 580. After completion of configuring and/or programming game layer 402, the game layer 402 is transferred via remote computer 580 to a removable media 584. In one preferred embodiment, the removable media is a flash memory card, and more preferably is a CompactFlash™ card. In one aspect, the flash memory card plugs into remote computer 580 via a PCMCIA slot. Suitable flash memory cards (i.e., a CompactFlash™ card) are commercially available from memory manufacturers, including SanDisk and Kingston.

The removable media 584 is removed from remote computer 580 and inserted in gaming system 400. In one aspect, removable media 584 can be "hot-inserted" directly into the controller board of gaming system 400. The removable media 584 contains game layer 402 including the game specific code and program files. As such, removable media 584 remains inserted into gaming system 400 during operation of the gaming system. In an alternative embodiment, the game layer 402 can be transferred (e.g., via a memory download) from removable media 584 to memory inside of gaming system 400.

In one embodiment, the removable media 584 is maintained in gaming system 400 during operation of the gaming system. As such, the gaming system program files may be verified for authenticity by gaming officials by simply removing the removable media 584 and inserting it in a computer or controller used for verifying/authenticating game code, indicated at 586.

Figure 11:
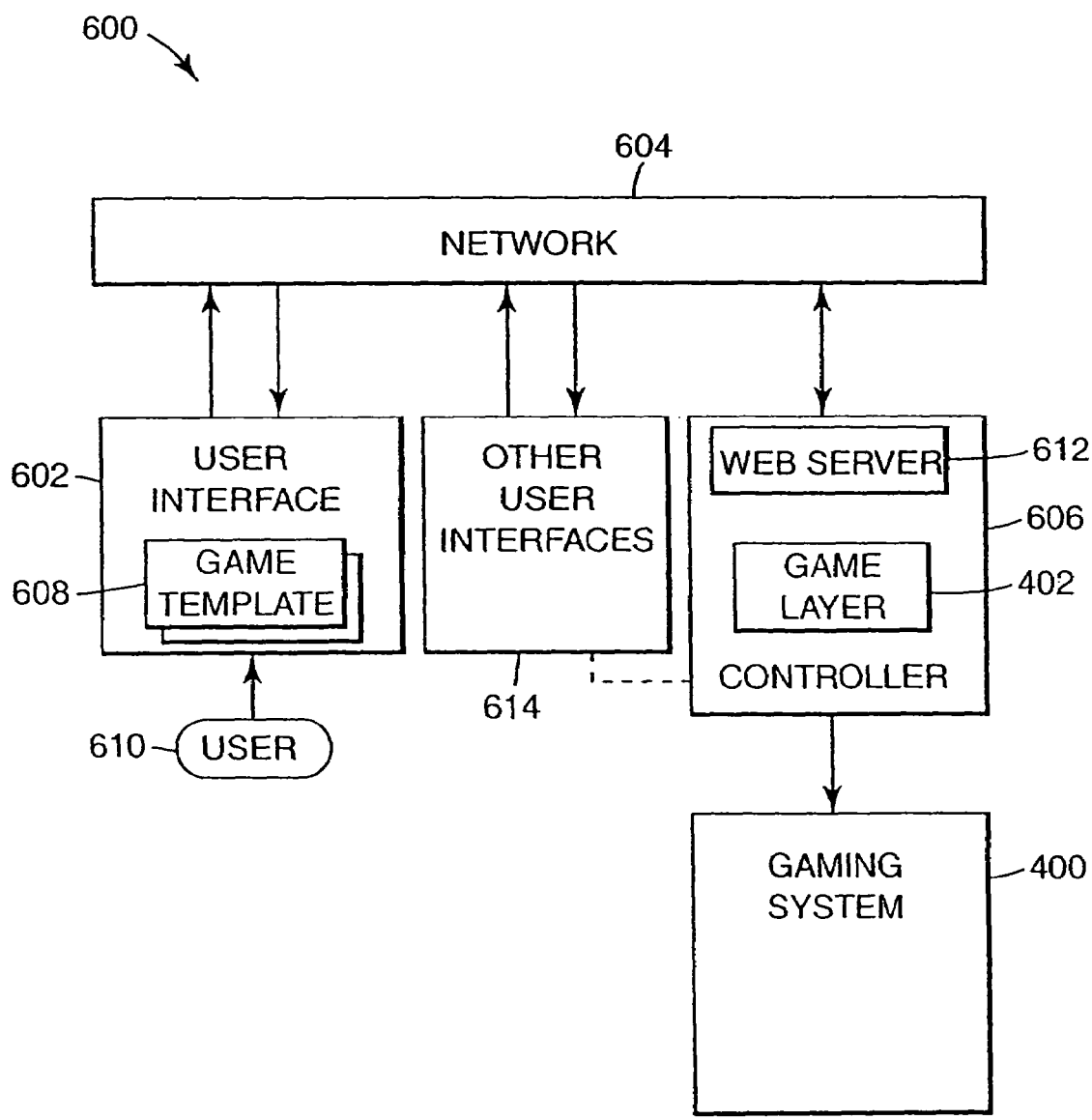
FIG. 11 is a diagram illustrating another exemplary embodiment of a gaming system according to the present invention wherein the game layer is programmable or configurable via a web page at a location remote from the gaming system.

FIG. 11 is another exemplary embodiment of a gaming system according to the present invention wherein the game layer is programmable or configurable at a location remote from the gaming system 400. In this embodiment, game layer 402 is configurable over a network based communication system. In one embodiment, network based system 600 includes a user interface 602, network or network communication link 604, and controller 606. Controller 606 is configured to communicate with user 610 via network 604. In particular, centralized controller 606 includes web server 612. User 610 accesses web server 612 via user interface 602, and downloads a web page suitable for configuring a game layer. In one aspect, the web page includes game specific game templates 608, which are utilized for inputting specific user configurations for individual games. Once a game template 608 has been configured, the game template is transferred to controller 606 via network 604. Controller 606 receives the configuration information associated with game template 608 and assembles game layer or program 402 using the configuration information. The game layer or program 402 can now be downloaded into memory in gaming system 400 for use by gaming system 400 including the game specific configurable options determined by user 610.

The system 600 also allows other user interfaces 614 for configuring games which may be assembled by controller 606 for use in other gaming systems. Alternatively, other user interface 614 may be representative of a gaming official checking the game 402 and authorizing use of the game 402 and gaming system 400. As such, the game layer 402 may be transferred to the gaming system 400 via controller 606, or via a communication link with user interface 614, which may be a direct connection or may be a network. Alternatively, game layer 402 may be transferred from controller 606 or user interface 614 by putting it on a flash memory device (e.g., Disk on a Chip or CompactFlash card) and physically inserted into gaming system 400.

Network 604, as used herein, is designed to include an internet network (e.g., the Internet), intranet network, or other high-speed communication system. In one preferred embodiment, network 604 is the Internet. While the exemplary embodiment and this detailed description refers to the use of web pages on the Internet network, it is understood that the use of other communication networks or next generation communication networks or a combination of communication networks (e.g., and intranet and the Internet) are within the scope of the present invention. The configuration information received from user interface 602 can be assembled into game layer 402 using hardware via a microprocessor, programmable logic, or state machine, in firmware, and in software within a given device. In one aspect, at least a portion of the software programming is web-based and written in HTML and/or JAVA programming languages, including links to the web pages for data collection, and each of the main components communicate via network 604 using a communication bus protocol. For example, the present invention may or may not use a TC/IP protocol suite for data transport. Other programming languages and communication bus protocols suitable for use with the system 600 according to the present invention will become apparent to those skilled in the art after reading the present application.

Figure 12:
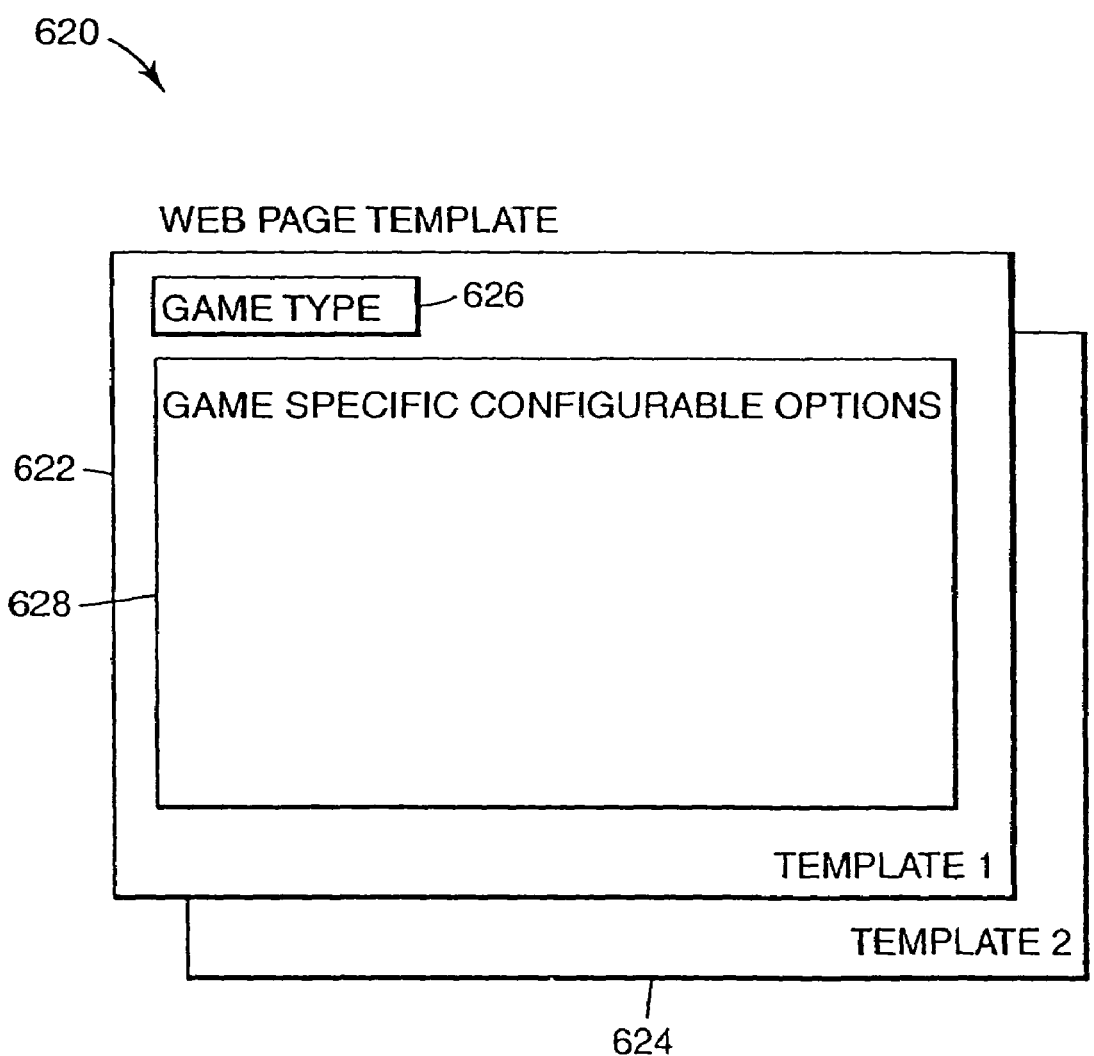
FIG. 12 is a diagram illustrating one exemplary embodiment of a web page template used in the gaming system shown in FIG. 11.

FIG. 12 is a diagram illustrating one exemplary embodiment of web page game templates used in the system shown in FIG. 11. Template 1 is shown at 622 and Template 2 is shown at 624. In one embodiment, upon accessing controller 606 via user interface 602, user 610 selects a game type that the user 610 would like to either program or configure. An example of a game type is a poker template. Based on the game type 626, a template appears at user interface 602 for that game type which allows the user to specify game configurable options, indicated at 628. The controller then operates to assemble the game layer or game programs 402 based on the information received via the game template. The configurable options may include any type of game specific configurable options, such as game colors, game sound, percentage payouts, game rules, game options, etc.

Figure 13:
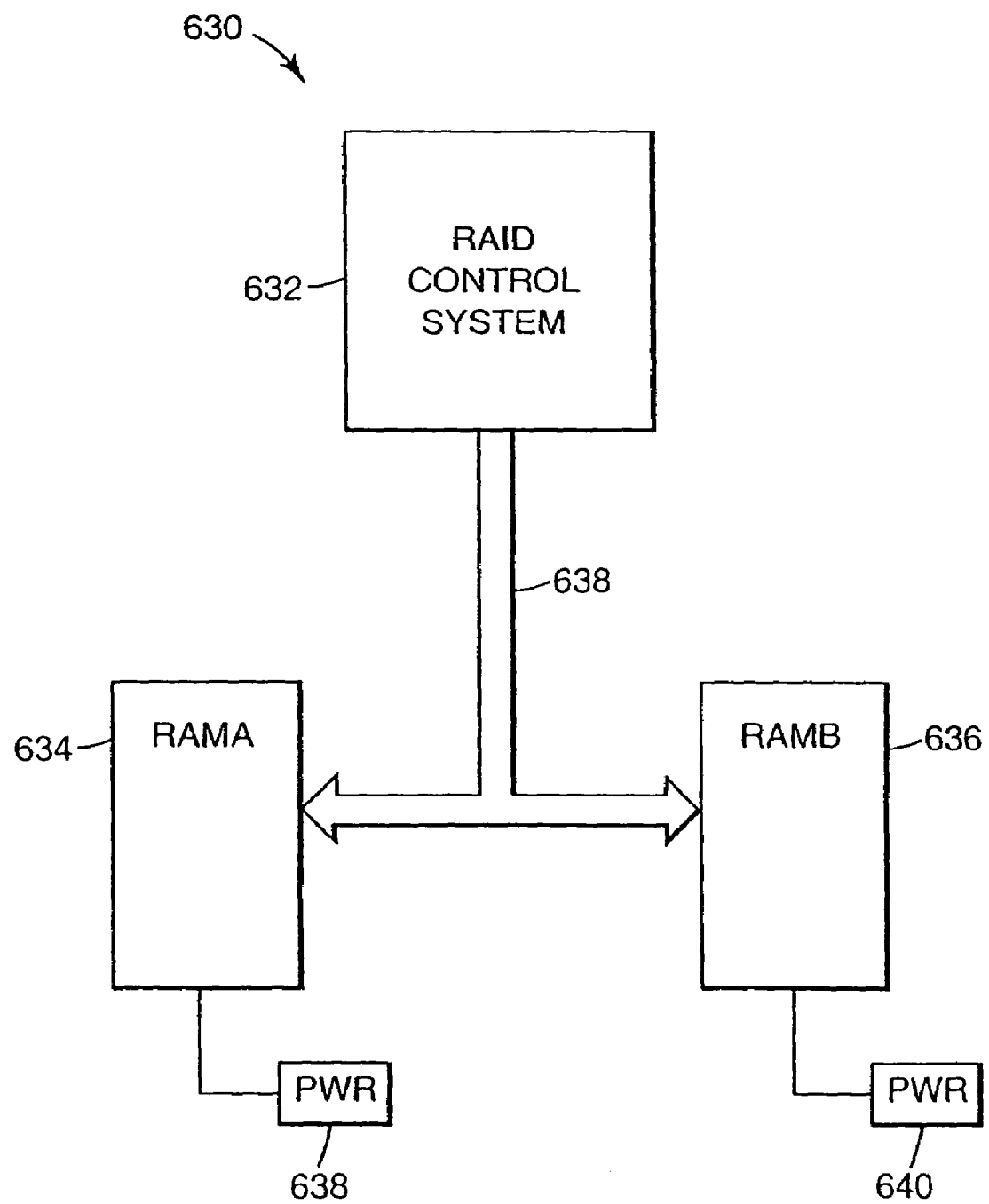
FIG. 13 is a diagram illustrating one exemplary embodiment of nonvolatile memory used in a gaming system according to the present invention, wherein the nonvolatile memory is configured as a RAID system.
Figure 14:
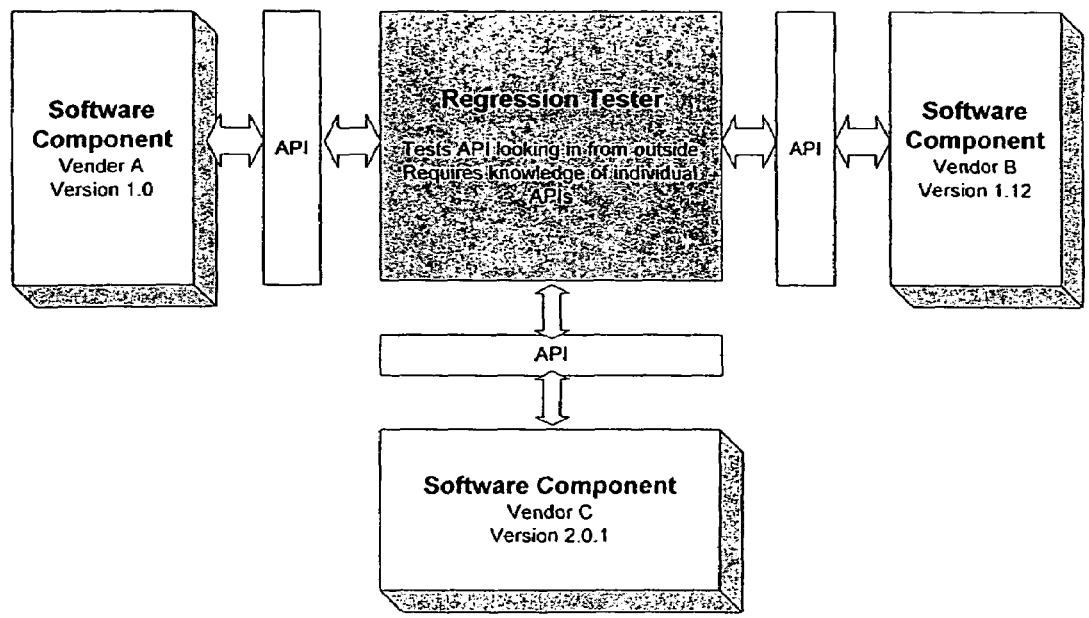
FIG. 14 is a block diagram that shows the operation of API's between software components.
Figure 14:
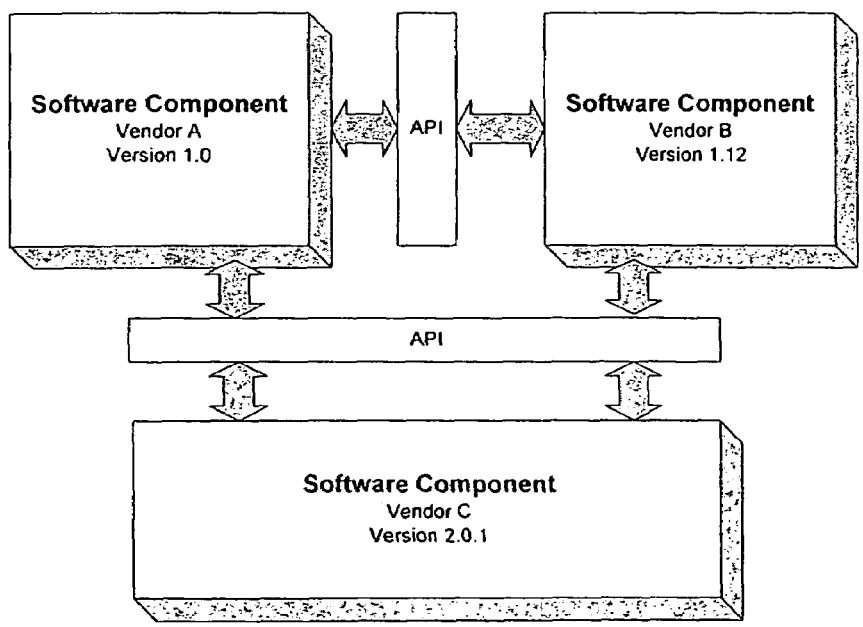

FIG. 13 is a diagram illustrating one exemplary embodiment of nonvolatile RAM used in a gaming system 400 according to the present invention, wherein the nonvolatile RAM is configured as a redundant memory system. In one exemplary embodiment shown, the nonvolatile RAM is configured as a RAID system. In the hard disk drive industry, RAID (short for redundant array of independent disks) systems employ two or more disk drives in combination for improved disk drive fault tolerance and disk drive performance. RAID systems stripe a user's data across multiple hard disks. When accessing data, the RAID system allows all of the hard disks to work at the same time, providing increase in speed and reliability.

A RAID system configuration as defined by different RAID levels. The different RAID levels range from LEVEL 0 which provides data striping (spreading out of data blocks of each file across multiple hard disks) resulting in improved disk drive speed and performance but no redundancy. RAID LEVEL 1 provides disk mirroring, resulting in 100 percent redundancy of data through mirrored pairs of hard disks (i.e., identical blocks of data written to two hard disks). Other drive RAID levels provide variations of data striping and disk mirroring, and also provide improved error correction for increased performance and fault tolerance.

In FIG. 13, one exemplary embodiment of RAID data storage system used in a gaming system 400 according to the present invention is generally shown at 630. The RAID storage system 630 includes a controller or control system 632 and multiple nonvolatile RAM data storage units, indicated as RAMA 634 and RAMB 636. In one aspect, RAMA 634 and RAMB 636 each include a backup power system PWR 638 and PWR 640. In one aspect, backup power systems PWR 638 and PWR 640 are battery backup systems. RAMA 634 and RAMB 636 are configured to communicate with control system 632 as a redundant array of storage devices. Preferably, nonvolatile memory RAMA 634 and nonvolatile memory RAMB 636 are configured similar to a RAID level configuration used in the disk drive industry (i.e., as a "mirrored pair"). Nonvolatile memory RAMA 634 and nonvolatile memory RAMB 636 communicate with control system 632 via communication bus 638, using a communication bus protocol. One exemplary embodiment of a communication bus suitable for use as communication bus 638 is an industry standard ATA or uniform serial bus (USB) communication bus. Control system 632 includes a microprocessor based data processing system or other system capable of performing a sequence of logical operations. In one aspect, control system 632 is configured to operate the RAID system 630 nonvolatile memories RAMA 634 and RAMB 636 as a mirrored pair. As such, read/write to nonvolatile memory RAMA 634 are mirrored to nonvolatile RAMB 636, providing redundancy of crucial gaming specific data stored in nonvolatile memory RAMA 634 and RAMB 636. Alternatively, the nonvolatile memory RAMA 634 and nonvolatile memory RAMB 636 may be configured to communicate with control system 632 similar to other RAID storage system levels, such as RAID LEVEL 0, RAID LEVEL 2, RAID LEVEL 3, RAID LEVEL 4, RAID LEVEL 5, RAID LEVEL 6, etc. Further, the RAID system 630 may include more than the two nonvolatile memories RAMA 634 and RAMB 636 shown.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of generating a computer based wagering application comprising:

providing a gaming operating system operable 1) to load a gaming application comprising a plurality of game program objects and to generate a wagering game on a computing system in response to information received from the gaming application, 2) to maintain a set of gaming data variables for reconstructing a state of the wagering game in response to a power loss or other malfunction on the computing system wherein the gaming operating system comprises a plurality of software components, one or more Application Program Interfaces (APIs), associated with the plurality of software components, that define information recognized by the gaming operating system and enable communication between the gaming application and the gaming operating system, and plural gaming callback functions that allow the wagering game to be provided on the computing system, said plurality of software components and gaming callback functions compatible with one or more of a plurality of different computing systems, a plurality of different gaming applications or combinations thereof; and wherein said plurality of software components and gaming callback functions can be provided by a plurality of different software vendors, 3) to determine a vendor associated with each of the plurality of software components, the one or more APIs associated with the plurality of software components and gaming callback functions; 4) to determine whether each software component associated with the vendor is related to a presentation, a determination or a storage of win-loss information for said wagering game; 5) to determine whether the vendor is license by a gaming regulatory authority to provide software components associated with the presentation, the determination, or the storage of win-loss information for said wagering game based upon said determination of whether each software component associated with the vendor is related to the presentation, the determination or the storage of win-loss information for said wagering game;

providing the one or more APIs that define the information that is recognized by the gaming operating system and enable communication between the gaming application and the gaming operating system wherein the one or more APIs are designed or configured to allow the gaming application to at least 1) access a non-volatile memory (NV-RAM) wherein the NV-RAM is for at least storing the set of gaming data variables, 2) specify storage requirements for the NV-RAM including information related to the set of gaming data variables, 3) provide instructions related to outputting video data or audio data available with the gaming operating system, provide instructions for peripheral devices recognized by the gaming operating system wherein the instructions are translated by the gaming operating system into formats recognized by the peripheral devices, 5) request one or more random number to be generated and 6) provide gaming application specific data used in the wagering game;

determining that a portion of the plurality of software game components and call back functions are required by the gaming application;

providing a configuration file for running the gaming operating system on the computing system; and compiling a gaming program specific to the gaming application and that is compatible with the gaming operating system wherein the gaming program includes the portion of the plurality of software gaming components and the callback functions.

2. The method of claim 1, wherein the plurality of software gaming components are selected from the group consisting of random number generator, game initiation sequence, bonus module, video gaming module, audio gaming module, jackpot module, graphics conversion tool, debugging tool, payout table module, value-handling module, power-loss recovery module, gaming payout history module, player history module, and user interaction module.

3. The method of claim 1 wherein public and/or private authentication keys are revved and different public and/or private authentication keys are provided to each of at least two different legal jurisdictions to prevent one or more of the gaming application or the gaming operating system approved to operate in a first legal jurisdiction from operating in a second legal jurisdiction.

4. The method of claim 1 wherein the computer based wagering game application is developed for an apparatus comprising:

a computerized game controller including a processor, memory, and the NV-RAM; and an operating system kernel that executes a system handler application.

5. The method of claim 4 wherein the system handler application comprises:

a plurality of the device handlers, software having the ability when executed to:
 load the gaming program; and
 execute the gaming program;

the API with functions callable from the gaming program; and an event queue for executing specified ones of the plurality of device handlers in an order.

6. The method of claim 4 wherein a first gaming data variable in the set of gaming data variables is modified by a first game program object in the plurality of game program objects via the API prior to the execution of a second game program object in the plurality of game program.

7. The method of claim 6, and wherein the first gaming data variable modified by the first game program object is stored in the NV-RAM and changing the first gaming data variable in the NV-RAM causes execution of a corresponding callback function or a corresponding device handler.

8. The method of claim 4, wherein the operating system kernel is a an open operating system kernel having customized proprietary modules and the kernel has at least one modification wherein each modification is selected from the group consisting of: 1) accessing user level code from ROM, 2) executing from ROM, 3) zero out unused RAM, 4) test and/or hash the kernel, and 5) disabling selected device handlers.

9. The method of claim 4 wherein the apparatus contains a machine-readable component with machine-readable instructions thereon, the instructions when executed are operable to cause the processor to manage at least one of the plurality of game program objects via the system handler application and to execute a single gaming program object at any one time, wherein at least two of the plurality of game program objects are operable to share game data via the NV-RAM.

10. A method wherein after compiling the gaming program specific to the gaming application that is compatible with the gaming operating system according to claims 1, 2, 3, 4 or 5, the gaming program manages data in the computer based wagering game apparatus via a system handler application, where managing data comprises:

loading a first game program object in the plurality of game program objects, executing the first game program object, and accessing and storing game data related to the play of the wagering game in the NV-RAM.

11. The method of claim 10 wherein managing data further comprises a) unloading a first game program object, and loading a second game program object or b) executing a corresponding callback function upon alteration of the game data in the NV-RAM.

12. The method of claim 1 wherein after compiling the gaming program specific to the gaming application, a machine-readable memory storage element with instructions thereon has instructions that when executed to cause the computing system to:

load a first game program object in the plurality of game program objects to a memory, execute the first game program object, store gaming data in the NV-RAM in response to the execution of the first game program object, such that a second game program object in the plurality of game program objects later loaded can access the gaming data, unload the first game program object from the memory, and load the second game program object to the memory so that the second game program object is accessible to the computer for execution.

13. The method of claim 12 wherein additional instruction are executed to cause the computing system to perform a task selected from the group consisting of a) executing a corresponding callback function upon alteration of the game data in the NV-RAM; and b) managing events via a system handler application.

14. The method of claim 1 wherein the computer based wagering game application is developed for an apparatus comprising:

the gaming operating system stored in a memory storage component designed or configured to be operatively inserted along with game identity data into an electronic or electromechanical gaming device having ancillary functions so that the gaming device can effect play of the wagering game provided in the game identity data and the gaming operating system will control at least one ancillary function selected from the group consisting of coin acceptance, credit acceptance, currency acceptance and boot up.

15. The method of claim 14 wherein the API further comprises a plurality of APIs, and where the apparatus further comprises an operating system kernel customized for gaming purposes and an event queue.

16. The method of claim 14 wherein the gaming operating system controls access to a networked on-line system or controls a progressive meter.

17. The method of claim 14 wherein the gaming operating system comprises a kernel customized for gaming purposes utilizing a method of operation selected from the group consisting of: 1) accessing user level code from ROM, 2) executing from ROM, 3) zero out unused RAM, 4) test and/or hash the kernel, and 5) disabling selected device handlers.

18. A gaming machine comprising:
a computerized game controller comprising a processor, an executable memory, and a non-volatile memory (NV-RAM);
a gaming application executed by the computerized game controller;
a gaming operating system executed by the computerized gaming controller operable 1) to load the gaming application and to generate a wagering game on the gaming machine in response to information received from the gaming application and 2) to maintain a set of gaming data variables in the NV-RAM for reconstructing a state of the wagering game in response to a power loss or other malfunction on the computing system wherein the gaming operating system comprises a plurality of software gaming components, one or more Application Program Interfaces (APIs), associated with the plurality of software components, that define information recognized by the gaming operating system and enable communication between the gaming application and the gaming operating system and plural gaming callback functions that allow the wagering game to be provided on the computing system, said plurality of software gaming components and gaming callback functions compatible with one or more of a plurality of different gaming devices, a plurality of different gaming applications or combinations thereof; wherein said plurality of software gaming components and gaming callback functions can be provided by a plurality of different software vendors; and 3) to determine a vendor associated with each of the plurality of software gaming components, the one or more APIs and gaming callback functions; 4) to determine whether each software component associated with the vendor is related to the presentation, the determination, or the storage of win-loss information for said wagering game; 5) to determine whether the vendor is licensed by a gaming regulatory authority to provide software components associated with the presentation, the determination or the storage of win-loss information for said wagering game based upon said determination of whether each software component associated with the vendor is related to the presentation, the determination or the storage of win-loss information for said wagering game; and
the one or more APIs that define the information that it recognized by the gaming operating system and enable communication between the gaming application and the gaming operating system wherein the one or more APIs are designed or configured to allow the gaming operation to at least 1) access the NV-RAM wherein the NV-RAM is for at least storing the set of game data variables, 2) specify storage requirements for the NV-RAM including information related to the set of gaming data variables, 3) provide instructions related to outputting video data or audio data available with the gaming system, 4) provide instructions for peripheral devices recognized by the gaming operating system into formats recognized by the peripheral devices, 5) request one or more random number to be generated and 6) provide gaming application specific data used in the wagering game to the gaming operating system;
one or more value handling devices for inputting, outputting or combinations thereof, credits on the gaming machine wherein the credits are for wagers on the wagering game;
one or more input devices for providing input used to play the wagering game; and
a display device for displaying the wagering game on the gaming machine.

19. The gaming machine of claim 18, wherein the display device is one of mechanical reels or a video display.

20. The gaming machine of claim 14, wherein the plurality of software components are selected from the group consisting of random number generator, game initiation sequence, bonus module, video gaming module, audio gaming module, jackpot module, graphics conversion tool, debugging tool, pay-out table module, value-handling module, power-loss recover module, gaming payout history module, and user interaction module.

* * * * *

UNITED STATES PATENT AND TRADEMARK OFFICE
CERTIFICATE OF CORRECTION

| | | |
|---|---|---|
| PATENT NO. | : 7,618,317 B2 | Page 1 of 1 |
| APPLICATION NO. | : 10/241804 | |
| DATED | : November 17, 2009 | |
| INVENTOR(S) | : Mark D. Jackson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Nineteenth Day of October, 2010

David J. Kappos
*Director of the United States Patent and Trademark Office*